United States Patent Office 3,481,903
Patented Dec. 2, 1969

3,481,903
CHELATING COMPOSITIONS COMPRISING PRODUCTS OF ALDEHYDES AND TRIAZINE DERIVATIVES
Gaetano F. D'Alelio, South Bend, Ind., assignor of ten percent to Walter J. Monacelli, Cleveland, Ohio
No Drawing. Filed May 15, 1967, Ser. No. 638,614
Int. Cl. C08g 9/28
U.S. Cl. 260—67.6      20 Claims

ABSTRACT OF THE DISCLOSURE

The invention relates to compositions of matter comprising the condensation products of aldehydes and triazine derivatives having the property of coordinating metal ions. These compositions have particular utility in the plastics, coatings, and various other arts.

---

This invention relates to new chemical compounds and more particularly to triazine derivatives. The invention is concerned especially with the production and use of new and useful triazines having the property of coordinating metal ions.

The chemical compounds of this invention may be represented by the general formula,

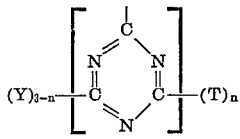

wherein Y represents any monovalent radical and T represents a coordination group more fully described hereinafter, and $n$ represents an integer of 1 to 3. When $n$ is 3, $3-n$ is zero; when $n$ is 2, $3-n$ is 1; and when $n$ is 1, $n-1$ is 2. More specifically, this invention is concerned with a triazine derivative having the formula

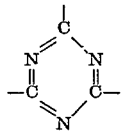

wherein at least one of said valencies is attached to a T group.

In the above triazine formula, Y can be R which represents hydrogen or any monovalent hydrocarbon radical, whether saturated or unsaturated, substituted or unsubstituted, aliphatic, carbocyclic, aryl or heterocyclic, mono- or polynuclear, etc. Examples of suitable hydrocarbon groups represented by R are aliphatic, aromatic, for example, methyl, ethyl, propyl, isopropyl, butyl, secondary butyl, butenyl, amyl, hexyl, allyl, methallyl, cyclopentenyl, cyclohexyl, cyclohexenyl, phenyl diphenyl, naphthyl, tolyl, xylyl, ethylphenyl, propylphenyl, isoproplphenyl, allylphenyl, benzyl, phenylallyl, phenylpropyl, etc., and their homologues, as well as those groups with one or more of their hydrogen atoms substituted by halogens, as, for example, fluorine, chlorine, nitro groups, nitroso groups, amino groups, carboxy groups, etc.; Y can also be hydroxyl and the alkoxy and aryloxy radicals of aliphatic, cycloaliphatic, aromatic and heterocyclic hydroxy compounds, such as methyl alcohol, ethyl alcohol, butyl alcohol, isobutyl alcohol, dodecyl alcohol, phenol, the o-, m-, and p-cresols, the xylenols, the naphthols, ethylene glycol, methyl glycol ether, butyl glycol ether, glycerine, pentaerythritol, naphthol, hydroxy pyridine, including the alkoxy and aryloxy radicals of hydroxy acids and esters, such as lactic acid, ethyl lactate, allyl lactate, methyl salicylate, and the chloro derivatives such as chlorophenol, chloronaphthol, ethylene chlorohydrin, and the acetoxy derivatives such as acetoxyethyl alcohol, etc.; and these radicals are represented by RO—; Y can also be R—S—groups which are the mercapto equivalents to RO—; Y can also be —NR$_2$, that is, an amino group, a monosubstituted amino group or a disubstituted amino group, as for example, the radicals of methyl amine, ethyl amine, butyl amine, nonyl amine, benzyl amine, dimethyl amine, aniline, naphthylamine, ethanolamine, diethanolamine, diisopropylamine, methylaniline, piperidine, amino-pyridine, and the hydrazine radicals, namely R$_2$NNR— from hydrazine, unsymmetrical dimethylhydrazine, symmetrical dimethylhydrazine, trimethylhydrazine, phenylhydrazines; Y can also be the N-radicals of the aminoacids, the aminoesters, the aminoamides, and the aminonitriles, some specific examples of which are

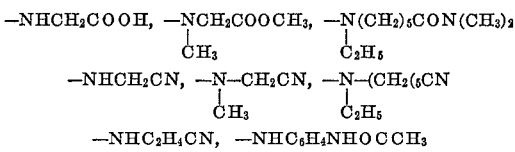

Y can also be radicals of alkylene imines, such as, for example

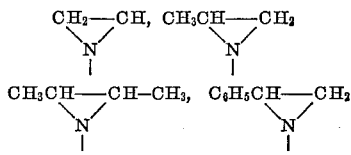

and the radicals of malonic esters and substtiuted malonic esters, nitriles, and amides, such as, for example,

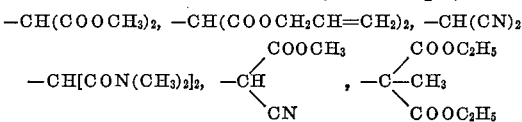

etc.; or Y can be the radical of another triazinyl ring, for example, (CN$_3$NH)$_2$(C$_3$N$_3$)—, (HO)$_2$(C$_3$N$_3$)—, or the triazine ring can be attached through a bridge, such as

[(CH$_3$)$_2$N]$_2$(C$_3$N$_3$)—NHCH$_2$CH$_2$NH—]
(C$_2$H$_5$NH)$_2$(C$_3$N$_2$)—OCH$_2$CH$_2$O—
(H$_2$N$_2$(C$_3$N$_3$)—NHCH$_2$CH$_2$O— etc., Y can also be chlorine, bromine, —CN, COOR, etc.; as well as T.

The Y group can also be a solubilizing group, or a group modified to impart solubility of the triazine compound in water or in organic solvents. A few illustrative examples of water solubilizing groups are
H(OCH$_2$CH$_2$)$_n$·O—,

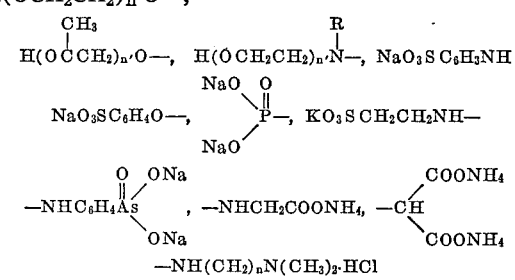

—NH(CH$_2$)$_n$N(CH$_3$)$_2$·HCl etc., wherein $n'$ has a numerical value of at least one and can be as high as 15 to 20.

When the new compounds of this invention contain Y groups of the type illustrated above, the compounds are non-resinous and non-polymeric and function as ligands in the formation of coordination compounds useful in the preparation of pigments and for removing metal ions from solutions. Because of the trivalent nature of the symmetrical triazine ring, a large number of permissible Y groups can be attached to the ring, including chemically active groups. When the Y groups are such that they can undergo addition or condensation polymerizations, then resins and polymers are readily prepared which are characterized by having within their repeating units a triazine ring to which at least one T group is attached. Furthermore, it is not necessary to prepare polymers of this type by polymerization reactions involving one or two Y groups, since it is possible, as shown hereinafter, to react many of the non-polymeric compounds of this invention with preformed polymers thereby attaching the triazinal coordination moiety to the preformed polymer.

Thus, the Y group can also be a postreactive group, such as an aldehyde reactive group, which may be designated as an A group, by which the new compounds of this invention can be converted to condensation products by reaction with the aldehydes, polymeric aldehydes, aldehyde-addition products, etc., such as formaldehyde, paraformaldehyde, acetaldehyde, propionaldehyde, acrolein, aldol, glucose, dimethylol urea, trimethylol melamine, hexamethylol melamine, etc.

The aldehyde-reactable group, A, is a grouping of atoms or radicals that react with aldehyde or polymeric-aldehydes to form a derivative such as illustrated by the following:

(a) $-NH_2 + CH_2O \longrightarrow -NHCH_2OO \xrightarrow{CH_2O} N(CH_2OH_2)$ (b)
$-NHR \xrightarrow{CH_2O} -N(R)-CH_2OH$ (c)
$-C_6H_4NH_2 \xrightarrow{CH_2O} -C_6H_4N=CH_2$ (d)
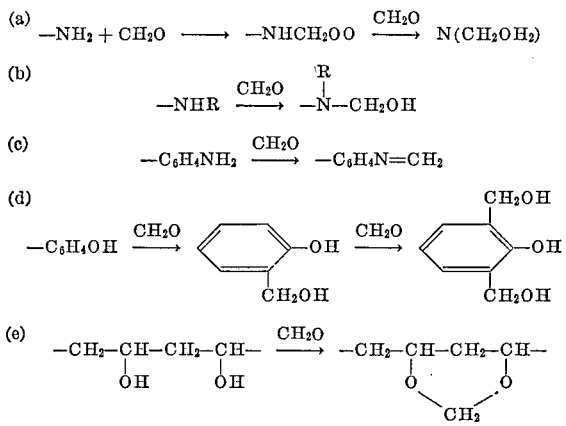

(e)
$-CH_2-CH-CH_2-CH- \xrightarrow{CH_2O} -CH_2-CH-CH_2-CH-$
       $|$        $|$                              $|$      $|$
      $OH$      $OH$                             $O$     $O$
                                                    $\diagdown CH_2 \diagup$ As illustrative examples of the aldehyde-reactable group, A, there are mentioned the following groups:

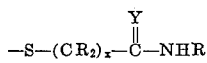

as disclosed in my U.S. Patent 2,295,562, issued Sept. 15, 1942, wherein x is an integer of at least 1 and not more than 2, Y represents a member of the class consisting of oxygen and sulfur, and R represents a member of the class consisting of hydrogen and monovalent hydrocarbon and halohydrocarbon radicals;

as disclosed in my U.S. Patent 2,295,565, issued Sept. 15, 1942, wherein Y represents a member of the class consisting of hydrogen and monovalent hydrocarbon and halohydrocarbon radicals;

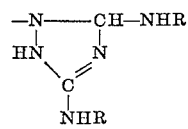

as disclosed in my U.S. Patent, 2,295,562, issued Sept. 15, 1942, wherein R represents a member of the class consisting of hydrogen and monovalent hydrocarbon and halohydrocarbon radicals;

as disclosed in my U.S. Patent 2,312,688, issued Mar. 2, 1943, wherein Y represents a member of the class consisting of oxygen and sulfur and R represents a member of the class consisting of hydrogen and hydrocarbon radicals and halohydrocarbon radicals;

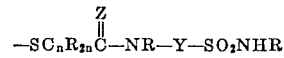

as disclosed in my U.S. Patent 2,312,690, issued Mar. 2, 1943, wherein n represents an integer and is at least one and not more than 2, Z represents a member of the class consisting of oxygen and sulfur, Y represents a bivalent carbocyclic radical, and R represents a member of the class consisting of hydrogen and monovalent hydrocarbon radicals and substituted hydrocarbon radicals;

—NR—Z—SO$_2$NHR as disclosed in my U.S. Patent 2,312,697, issued Mar. 2, 1943, wherein Z represents an aryl nucleus and R represents a member of the class consisting of hydrogen and monovalent hydrocarbon radicals and substituted hydrocarbon radicals;

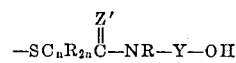

as disclosed in my U.S. Patent 2,312,700, issued Mar. 2, 1943, wherein n represents an integer and is at least one and not more than 2, Z' represents a member of the class consisting of oxygen and sulfur, Y represents a divalent carbocyclic radical and R represents a member of the class consisting of hydrogen and monovalent hydrocarbon radicals and substituted hydrocarbon radicals;

—NHR as disclosed in my U.S. Patent 2,335,846, issued Dec. 7, 1943, wherein R represents a member of the class consisting of hydrogen and monovalent hydrocarbon radicals and halohydrocarbon radicals;

—Z—CONHR wherein Z represents a divalent hydrocarbon radical and R represents hydrogen and a monovalent hydrocarbon radical and substituted hydrocarbon radicals;

—B—Z—CONHR wherein B represents a member of the class consisting of oxygen, sulfur and —NR, Z represents a divalent hydrocarbon radical and substituted hydrocarbon radicals, and R represents a member of the class of hydrogen and monovalent hydrocarbon radicals and substituted hydrocarbon radicals;

HNR—NR— wherein R represents a member of the class consisting of hydrogen and monovalent hydrocarbon radicals and substituted hydrocarbon radicals;

HO—Z— wherein Z represents a divalent aromatic radical and substituted hydrocarbon radicals as hereinabove defined. A few typical triazine compounds are

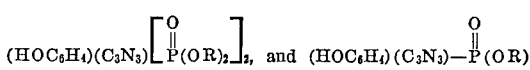

etc.;

HO—Z—NR— wherein R represents hydrogen and monovalent hydrocarbon radicals and substituted hydrocarbon radicals, and Z represents a divalent aromatic radical and substituted hydrocarbon radicals as hereinabove described. A few typical examples are

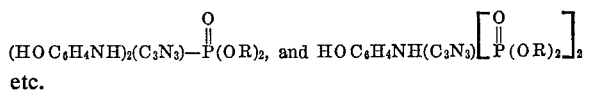
etc.

$$RCONHNR$$

wherein R represents hydrogen and a monovalent hydrocarbon radical and substituted hydrocarbon radicals as previously defined hereinabove;

$$R_2NCY—NR—CHR'—$$

as disclosed in my U.S. Patent 2,339,623, issued Jan. 18, 1944, wherein Y represents oxygen or sulfur, at least one R represents hydrogen and the other R's represent hydrogen, a monovalent hydrocarbon radical or a monovalent halogenated hydrocarbon radical and R' represents hydrogen or a monovalent aliphatic, carbocyclic or aromatic hydrocarbon radical of not more than 6 carbon atoms, etc.;

wherein R represents a member of the class of hydrogen and monovalent hydrocarbon radicals and substituted hydrocarbon radicals.

Thus it may be seen that when Y equals A, Y can also be any aldehyde-reactable group.

T represents a grouping of atoms having a chelating or coordination function with metal ions, that is, T contains functional groups capable of forming complexes with metal salts through covalent linkages rather than through electrovalent linkages.

The essential difference between the ordinary electrovalent bond and the covalent bonds in the coordination compounds may be demonstrated by comparing non-polymeric molecules containing such bonds. The bonds in the former is ionic and similar to those that exist in such compounds as sodium phosphate, copper acetate, nickel sulfate, aluminum nitrate and many other salts. The bonds in the latter metals such as chromium, iron, cobalt, molybdenum, uranium, nickel, copper, zinc platinum, mercury, gold, silver, titanium, zirconium, vanadium, etc. A typical example of such a coordination compound is hexaminecobalt(III) chloride, whose formula is $$[CO(NH_3)_6]Cl_3$$

this compound is prepared by reacting cobaltic chloride, $CoCl_3$, which has its ionic valencies satisfied, with six (6) moles of ammonia whereby the ammonia molecules are coordinated to the cobalt atom through nonionic covalent linkages. Ethylenediamine will also complex with cobaltic chloride to give trisethylenediaminecobalt (III) chloride.

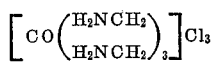

When the complexing compound, such as ethylenediamine, can occupy simultaneously more than a single coordinating position, ring formation can occur and ring structures may be found in the complex. Such ring compounds are known as chelate compounds. The ring-forming groups are known as polydentate groups or as chelating groups, in contrast to the monodentate groups which may coordinate without forming ring or chelate compounds.

A large number of organic compounds containing suitable substituent groups function as chelating compounds of which ethylenediamine, diethylenetriamine, etc., are typical examples. Another example is 2,2'-dipyridyl which complexes with ferrous chloride to give

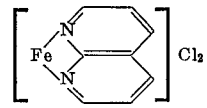

Other organic compounds which contain in their structure both salt forming groups and neutral donor groups can, through coordination or chelation, satisfy both the oxidation number of, and the coordination number of many metal ions, a typical example of which is the copper(II) chelate of 8-hydroxyquinoline,

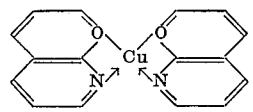

Glycine and substituted glycines behave similarly, as shown in copper(II) glycinate,

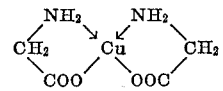

Accordingly, it is a proposal of this invention to attach T groups which act as coordination groups to the triazine rings, in which the T groups are selected from the class consisting of (1) 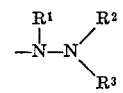

wherein each of the symbols, $R^1$, $R^2$ and $R^3$ individually represent a radical selected from the class consisting of H, —$CHR^4COOM$, and a hydrocarbon radical containing one to six carbon atoms and wherein at least one of the radicals represented by $R^1$, $R^2$, and $R^3$ contain a carboxyl group; M is a member consisting of hydrogen, ammonium bases and metals and $R^4$ represents a radical selected from the class of H and a hydrocarbon radical containing one to six carbon atoms. A few illustrative examples of the

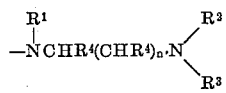

group are: —NH—NHCH$_2$COOM;

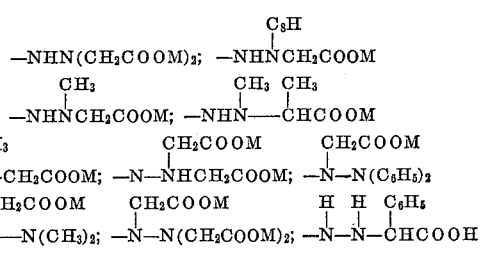

etc.

(2) 

wherein $R^1$, $R^2$, $R^3$, $R^4$ have the same meaning as previously described hereinabove, and $n'$ represents an integer of one to six. A few typical examples of these groups are:

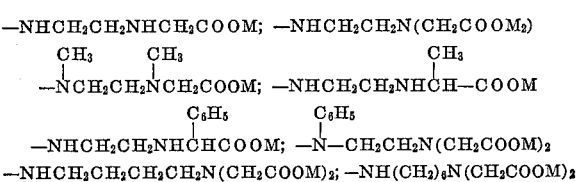

(3) 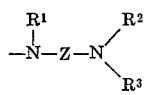

wherein $R^1$, $R^2$ and $R^3$ have the same meaning as described hereinabove, and —Z— is a divalent aromatic hydrocarbon radical containing six to twelve carbon atoms. A few illustrative examples of these groups are:

$-NHC_6H_4NHCH_2COOM$; $-NHC_6H_4N(CH_2COOM)_2$

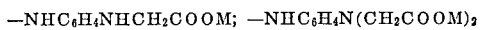

$-NHC_6H_2(CH_3)_2NHCH_2NHCH_2COOM$; $-NHCH_{10}H_6NHCH_2COOM$ (4) 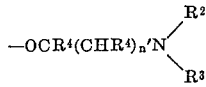

wherein $R^2$, $R^3$, $R^4$ and $n'$ have the same meaning as defined hereinabove, and a few illustrative examples are:

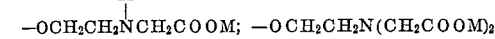

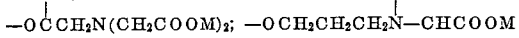

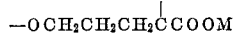

etc.

(5) 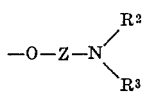

wherein Z, $R^2$ and $R^3$ have the same meaning as defined hereinabove, a few illustrative example of which are:

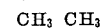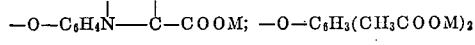

etc.

In general, the triazine compounds used in the practice of this invention can be prepared conveniently by reacting in the presence of a hydrohalide acceptor, HAC, the corresponding halotriazines, for example the bromo- or chloro-triazines with the corresponding halotriazines, for example, the bromo- or chloro-triazines with the corresponding TH compounds wherein T is as previously defined, and H is an active hydrogen attached to the T group, e.g.,

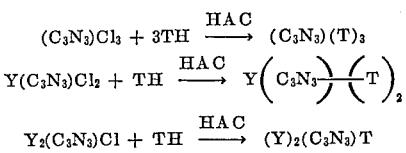

and some specific examples of the above reactions are

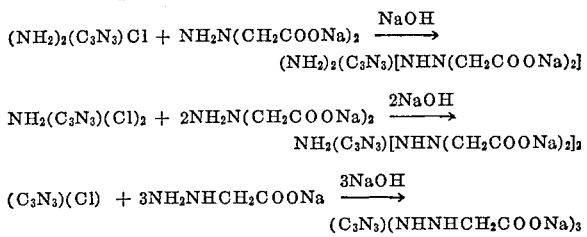

Alternately, these compounds can be prepared by using a halotriazine containing a T group as a substituent and reacting it with a compound containing a reactive hydrogen represented by YH, as for example:

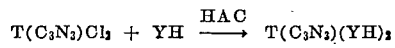

and

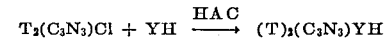

and typical specific examples of the above reactions are

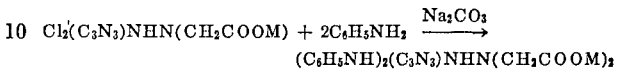

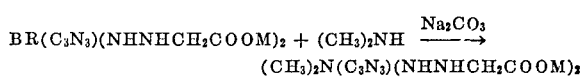

The present invention is based on the discovery that new and valuable materials are obtained by having at least one T group of the type described above attached to the triazine ring. They can be used in the treatment of water to coordinate metallic ions and to maintain the ions in solutions when water-solubilizing groups are attached to the triazine ring, e.g., $[H(OCH_2CH_2)_3NH]_2C_3N_3NHN(-CH_2COOM)_2$ As such, they are useful in laundering, chemical processing, etc. They can also be used in the preparation of stable pigments as for example the copper coordinate of $(C_3N_3)(NHNCH_2COOH)_2$ is a stable blue and the cobalt coordinate is a stable red. These coordinate-pigments are water insoluble, especially if to the triazine there is attached one or two Y groups contributing to water insolubility, e.g., $(C_4H_9)_2N(C_3N_3)NHN(CH_2COOM)_2$ and $[(C_4H_9)_2N]_2C_3N_3NHN(CH_2COOM)_2$ and they become organophilic when Y contains hydrocarbon groups such as $(C_{12}H_{25}NH)_2C_3N_3(NHCH_2CH_2NCH_2COOM)$ and $C_{12}H_{25}NHC_3N_3[OCH_2CH_2N(CH_2COOM)_2]$ The compounds of this invention having suitable Y groups can be used also to prepare addition and condensation polymers which coordinate with metal ions. One class of condensation polymers can be prepared when the Y group attached to the triazine ring is an aldehyde reactable group as previously described herein, such as in $NH_2(C_3N_3)NHN(CH_2COOM)_2$ by reaction with an aldehyde, including aldehydes, hydroxy aldehydes and aldehyde addition products, e.g., paraformaldehyde, aldol, glucose, dimethyl urea, the methylol melamines, etc., to prepare products having utility as chelating resins for the isolation and separation of metal ions from dilute or concentrated solutions, as well as utility in the plastics, coating and impregnating arts. As chelating resins they are particularly useful in recovering the metals of the common chelating-forming metals, such as Al, Ti, V, Si, Cr, Mn, Fe, Co, Ni, Cu, Zn, Ga, Ge, As, Y, Zr, Cb, Mo, Tc, Rn, Pl, Pd, Ag, Cd, In, Sn, Sb, Hf, Ta, W, Rh, Os, Ir, Pt, Au, Hg, Tl, Pb, Bi, the lanthanides, the actinides, Sc, Ca, and Mg, and for separating the metals from each other.

In preparing condensation products with aldehydes and the triazines of this invention, the initial condensation reaction can be carried out at normal or elevated temperatures, at atmospheric, sub-atmospheric, or super-atmospheric pressures, and under natural, alkaline, or acid conditions. Preferably, in most cases, the reaction between the components is initiated under alkaline conditions.

Any substances yielding an alkaline or an acid aqueous solution can be used in obtaining alkaline or acid conditions for the initial condensation reaction. For example, an alkaline substance such as sodium, potassium carbonate, mono-, di-, or tri-amines, etc., can be used. In some cases, it is desirable to cause the initial condensation reaction between the components to take place in the presence of a primary condensation catalyst and a secondary condensation catalyst. The primary catalyst can be either an aldehyde-non-reactable nitrogen-containing basic tertiary compounds, e.g., tertiary amines such as trialkyl (e.g. trimethyl, triethyl, etc.) amines, or an aldehyde-reactable nitrogen-containing basic compound, for instance, ammonia, primary amines (e.g., ethyl-amine, propyl amine, etc.) and secondary amines (e.g. dipropylamine, dibutylamine, etc.). The secondary condensation catalyst, which ordinarily is used in an amount less than the amount of the primary catalyst, advantageously is a fixed alkali, for instance, a carbonate, cyanide, or hydroxide of an alkali metal (e.g. sodium, potassium, lithium, etc.).

Illustrative examples of acid condensation catalysts that can be employed are inorganic or organic acids, such as hydrochloric, sulfuric, phosphoric, acetic, lactic, acrylic, malonic, etc., or acid salts, such as sodium acid sulfate, mono-sodium phosphate, monosodium phthalate, etc. Mixtures of acids, of acid salts, or acids and acid salts can be employed, if desired.

The reaction between the aldehyde, e.g., formaldehyde, and the triazine derivatives can be carried out in the presence of solvents, diluents, fillers, or other natural or synthetic resinous bodies, or while admixed with other materials that also can react with the aldehydic compound or with the triazine derivative, e.g., ketones, urea, thiourea, selenourea, iminourea (guanidine), substituted ureas, thioureas, solenoureas, and iminoureas, numerous examples of which are given in my U.S. Patent 2,322,566, issued June 22, 1943; monoamides of monocarboxylic acids and polycarboxylic acids and polyamides of polycarboxylic acid, e.g., acetamide, halogenated acetamides (e.g. chloroacetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazine compounds, such as are disclosed in my U.S. Patent 2,382,211, issued Aug. 14, 1945; amino-triazines, e.g., melamine, ammeline, ammelide, melem, melam, melon, etc.; phenol and substituted phenols, e.g., the cresols, the xylenols, the tertiary alkylphenols and other phenols such as mentioned in my U.S. Patent 2,339,441; monohydric and polyhydric alcohols, e.g., butyl propylene glycol, pentaerythritol, polyvinyl alcohol, etc., amines, including aromatic amines, e.g., aniline, etc., and the like. In such cases, the triazine derivative should represent 5–95% by weight of the aldehyde reactive portion of such mixture.

The modifying reactants can be incorporated with the triazine derivative and the aldehyde to form an intercondensation product by mixing all the reactants and effecting condensation therebetween or by various permutations of reactants. For instance, a partial condensation product can be formed of ingredients comprising (1) urea or melamine or urea and melamine, (2) a triazine derivative of this invention, (3) an aldehyde, including polymeric aldehydes, hydroxy aldehydes, and aldehyde-addition products, for instance, formaldehyde, paraformaldehyde, dimethylol urea, a polymethylol melamine; and thereafter reaction effected between this partial condensation product, and, for example, a curing reactant, specifically a chlorinated acetamide or an amino acid.

Some of the condensation products of this invention are thermoplastic materials even at an advanced stage of condensation, while others are thermosetting or potentially thermosetting bodies that convert under heat or under heat and pressure to an insoluble infusible state. The thermoplastic condensation products are of particular value as plasticizers for other synthetic resins. The thermosetting, or potentially thermosetting resinous condensation products, alone or mixed with fillers, pigments, dyes, lubricants, plasticizers, curing agents, etc., can be used for example, in the production of molding and laminating compositions. In other cases, they can be used as ion exchange resins and as tanning agents.

The liquid intermediate condensation products of this invention can be concentrated by the removal of, or diluted further by the addition of volatile solvents, to form liquid coating compositions of adjusted viscosity and concentration. The heat-convertible or potentially heat-convertible resinous condensation products can be used in the liquid state, for instance, as impregnants for wood, leather, paper and other porous bodies; as surface-coating materials in the production of paints, varnishes, lacquers, enamels, etc.; for general adhesive applications in producing laminated articles, and for other purposes. The liquid, heat-hardenable or potentially heat-hardenable condensation products also can be used directly as casting resins, while those which are gell-like by nature in the partially condensed state can be granulated and dried to form clear, unfilled heat-convertible resinous products.

In producing these new condensation products the choice of the aldehyde is dependent largely on economic considerations and upon the particular properties desired in the finished product. Preferred aldehyde reactants are formaldehyde and compounds engendering formaldehyde, e.g., paraformaldehyde, hexamethylene, tetraamine, etc. Illustrative examples of other aldehydes that can be employed are acetaldehyde, propionaldehyde, butyraldehyde, heptaldehyde, octaldehyde, acrolein, methacrolein, crotonaldehyde, benzaldehyde, furfural, hydroxyaldehydes (e.g., aldol, glucose, glycollic aldehyde, glyceraldehyde, etc.), mixtures thereof or mixtures of formaldehyde (or compounds engendering formaldehyde) with such aldehydes. Illustrative examples of aldehyde-addition products that can be used instead of the aldehydes themselves are the mono- and poly-(N-carbinol) derivatives, particularly the mono- and polymethylol derivatives of urea, thiourea, selenurea, and substituted ureas, thioureas, selenoureas, and iminoureas, mono- and poly-(N-carbinol) derivatives of amides or polycarboxylic acids, e.g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminotriazines. Particularly good results are obtained with active methylene-containing bodies as a methylol urea more particularly mono- and dimethylol ureas, a methylol aminotriazine, more particularly a methylol melamine, e.g., monomethylol melamine and polymethylol melamines (di-, tri-, tetra-, penta-, and hexamethylol melamines). Mixtures of aldehydes and aldehyde-addition products can be employed, e.g., mixtures of formaldehyde and methylol compounds, such for instance, as dimethylol urea, trimethylol melamine, hexamethylol melamine, etc.

The ratio of the aldehydic reactant to the triazine derivatives can be varied over a wide range depending upon the particular properties desired in the finished product. Ordinarily these reactants are employed in an amount corresponding to at least one mole of the aldehyde, especially formaldehyde, for each mole of the triazine derivative. Thus, for example, one to seven or eight or more moles of an aldehyde can be used for each mole of the triazine derivative. When an aldehyde is available for reaction in the form of an alkylol derivative, more particularly a methylol derivative such, for instance, as dimethylol urea, trimethylol melamine, etc., then higher amounts of such aldehyde-addition products are used, for instance, from 2 to 3 up to 15 to 20 or more moles of such alkylol derivatives for each mole of the triazine derivative.

As indicated hereinabove, the properties of the fundamental resin can be varied widely by introducing other modifying bodies before, during, or after effecting condensation between the primary components. Thus modifying agents that can be used include, for example, methyl, ethyl propyl, isopropyl, isobutyl, hexyl, etc., alcohols; polyhydric alcohols, such as, for example, diethylene glycol, triethylene glycol, pentaerythritol, etc., alcohol ethers, e.g., diethylene glycol monobutyl ether, etc.; amides, such as formamide, stearamide, acrylamide, benzene sulfonamides, toluene sulfonamide, the aryl disulfonamides, adipic diamide, phthalamide, etc.; amines, e.g., ethylene diamine, phenylene diamine, etc.; ketones, including halogenated ketones, etc.; nitriles, including halogenated nitriles, e.g., acrylonitrile, methacrylonitrile, succinonitrile, fumaryl nitrile, chloroacetonitriles, etc.; acylated ureas, more particularly halogenated acylated ureas of the kind described in my U.S. Patent 2,851,559, and others.

The modifying bodies can also take the form of high molecular weight bodies with or without resinous characteristics, for example, hydrolyzed wood products, formalized cellulose derivatives, lignin, protein aldehyde condensation products, aminotriazine, aldehyde condensation products, aminotriazolealdehyde condensation products, polyacrylamide, styrene-maleic imide copolymers, etc. Other examples of modifying bodies are the urea-aldehyde condensation products, the aniline-aldehyde condensation products, furfural condensation products, phenol-aldehyde condensation products, modified or unmodified, saturated or unsaturated polyhydric-alcohol-polycarboxylic acid condensation products, water-soluble cellulose derivatives, natural gums and resins, such as shellac, rosin, etc.; polyvinyl compounds, such as polyvinyl esters, e.g., polyvinyl acetate, polyvinyl butyrate, etc., polyvinyl ethers including polyvinyl acetals, especially polyvinyl formal, etc.

Dyes, pigments, plasticizers, mold lubricants, opacifiers and various reinforcing fillers (e.g., wood flour, glass fibers, including difibrated asbestos, mineral wool, mica, cloth cuttings, glass cloth, glass mat, etc.) can be compounded with the resin in accordance with conventional practice to provide various thermoplastic and thermosetting molding compositions.

The modified and unmodified resinous compositions of this invention have a wide variety of uses. For example, in addition to their use in the production of molding compositions, they can be used as modifiers of other natural and synthetic polymers, as laminating varnishes in the prdouction of laminated articles wherein sheet materials, e.g., paper, cloth, sheet asbestos, glass mats and glass fibers, etc., are coated and impregnated with the resin, superimposed and thereafter united under heat or heat and pressure. They can be used in the production of wire coatings or baking enamels from which insulated wires and other coated products are made; for bonding or cementing together mica flakes to form a laminated mica article, for bonding together abrasive grains in the production of resin-bonded abrasive articles such, for instance, as grindstones, sandpapers, emery cloths, etc., in the manufacture of electric resistors, etc. They can also be employed for treating cotton, linen, and other cellulosic materials in sheet or other from. They can also be used as impregnants for electrical coils and for other electrically insulating applications.

One aspect of the present invention is based on the discovery that new and valuable materials having particular utility in the polymer, plastics, impregnating, and coating arts can be produced by effecting reaction between ingredients comprising an aldehyde, including polymeric aldehydes and aldehyde-addition products, and triazine compounds of the kind described hereinabove. The modified and unmodified condensation products have a wide variety of uses. Those condensation products having the T grouping can be used as molding compounds, laminating varnishes, impregnants alone or with other polymers and fillers, in the conventional manner; they act as preservatives for cellulosic substances, such as paper, wood, cotton, wool, leather, silk, proteins and the like; and they can also be used as resins to increase the wet strength of paper and wood pulps. Those condensation products containing an $$-SO_3H \text{ or } -\overset{O}{\underset{\|}{As}}(OH)_2$$

grouping can be used as ion exchange resins, as preservatives, as their copper or 8-hydroxy quinoline salt, as additive-binders to insecticidal formulations, and as additives to increase the wet strength of paper while preserving it. The calcium, zinc, and magnesium salts of these products can be used as molding compounds and as modifiers for other natural and synthetic polymers, for example, in laminating varnishes and in the production of laminated products wherein sheet materials, e.g., paper, cloth sheet asbestos, glass mats, glass fibers, etc., are coated and impregnated with resin, superimposed and thereafter united under heat and pressure.

The condensation products of this invention containing chromium are particularly useful in the treating and tanning of leathers. As is well known, resin tannage should be water-soluble or water-dispersible and their solutions should tolerate fair concentration of salt. They should be capable of penetrating into the skin before and during early stages of tanning and before and during the early stages of polymerization. Preferably the tannage should be very pale or water-white in color. These objectives are achieved by using products made according to the practice of this invention; for example, the tolerance to the salt solution, that is, the salting-out value of the water-solubility can be changed by varying the number of T acids attached to the triazine ring, e.g., $(NH_2)(C_3N_3)$ or $(NH_2)_2(C_3N_3)$—T or by using a sulfonic acid substituent along with the T, e.g., $$(NH_2)(C_3N_3)(-NHC_6H_4SO_3Na)(T)$$

or $(NH_2CONHNH)(-NHC_6H_4SO_3Na)(T)$ or by condensing with urea, melamine, dimethylol urea, dimethylol melamine, trimethylol melamine, phenol alcohols, etc., and by varying the ratio of such modifying condensing substances. Also by using the products made according to the practice of this invention, the fat-liquoring characteristics of the tannage can be readily changed by selecting appropriate R groups in the triazine derivative, for example by using $(C_{10}H_{21}NH)_2(C_3N_3)$—T and $$(C_{10}H_{21}NH)(C_3N_3)(T)_2$$

instead of the corresponding —$NH_2$ substituted triazines. Furthermore, the solubility or dispersibility of the condensation product can be increased by using as Y groups those groups that increase solubility such as $$H(OCH_2CH_2)_n-O-$$

and $H(OCH_2CH_2)_{n''}-O-$ where $n''$ has a numerical value of one to fifty or more. Also, these condensation products can be modified so that they act as flame-retardants as well as preservatives not only for leather but for such substances as wool, cotton, wood, paper, etc., by using compounds in the practice of this invention in which Y represents groups such as:

$$-\overset{O}{\underset{\|}{P}}(OR)_2, \quad -\overset{O}{\underset{\|}{\underset{NR_2}{P}}}-OR, \quad -C_6Cl_5$$

etc.

The triazine derivatives embraced by the formulas of the various classes of compounds used in producing the new condensation products of this invention are the triazine derivatives having substituents indicated by the groups attached to the structure,

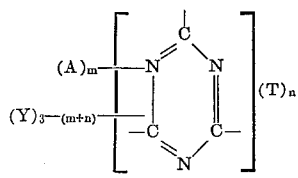

wherein $n$ and $m$ are integers of at least one and no more than 2 and the sum of $n$ and $m$ does not exceed three, and A, Y and T are as hereinabove defined.

A further aspect of the present invention is concerned with the polyester class of polymers which can be prepared by reacting a polycarboxylic acid, or its anhydride or chloride with a triazine of this invention having two or more alcoholic hydroxylic groups, e.g.,

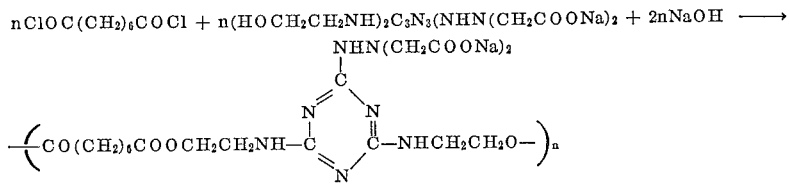

Further, by the use of such alcohols, polyurethanes can also be prepared as another class of condensation polymers, such as

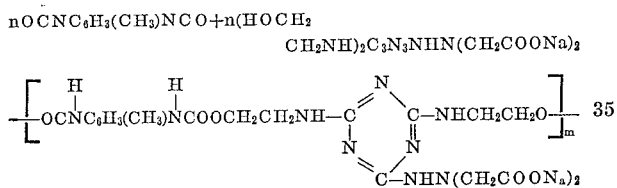

As another aspect, the polyamide condensation polymers can also be prepared within the discoveries of this invention by reacting a polycarboxyl acid, its anhydride, its acid chloride or its esters with a diaminotriazine, e.g.

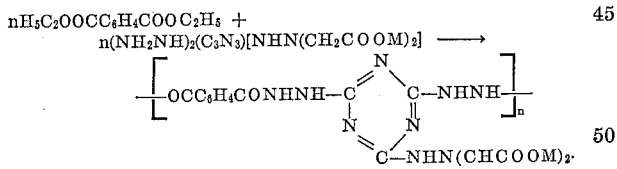

The addition polymers are classified as a class distinct from condensation polymers. I have also discovered that I can prepare addition polymers falling within the scope of this invention.

One class of addition polymer is the linear polymer derived from a triazine derivative containing at least one T group, and one Y and $A^1$ group containing a polymerizable terminal $CH_2=C<$ group as in the monomers:

$CH_2=CHCOOCH_2CH_2NH(C_3N_3)[N(CH_3)_2]$
[NHN(CH_2COOM)_2]

$CH_2=CHC_6H_4NH(C_3N_3)[N(CH_3)_2]$
[NHN(CH_2COOM)_2]

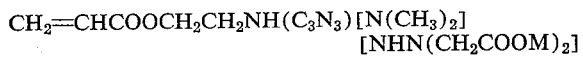

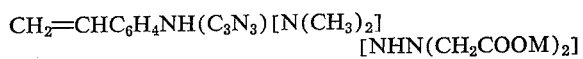

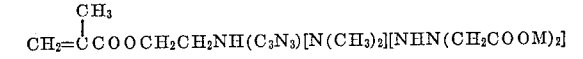

wherein polymerization of the $CH_2=C<$ group in the monomer results in the polymer.

Another class of addition polymers in the crosslinked polymers derived from a triazine derivative containing one T group and 2 groups containing a $CH_2=C<$ group as in the monomers:

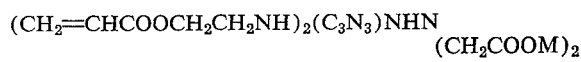

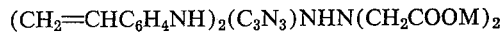

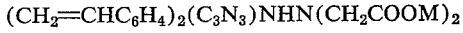

etc.

A further class of addition polymer of this invention is the addition polymerization products of a triazine derivative containing at least one T group and at least one other group containing an oxirane structure, as in the monomers:

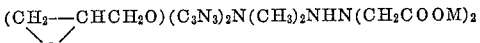

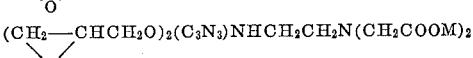

A still further class of addition polymers is derived by the polymerization of a triazine derivative containing at least one T group and at least one alkylene imino group such as in the monomer:

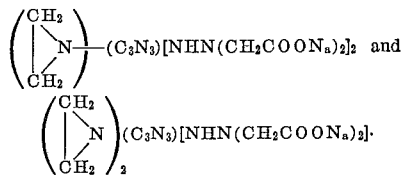

Many of the triazine derivatives of this invention can also be used to modify preformed polymers and copolymers having reactive hydrogens, such as cellulose, polyvinyl alcohol, wool, para cresol-aldehyde resins, polyvinyl amine, polyacrylic acid, etc., as illustrated by polyvinyl alcohol, thus:

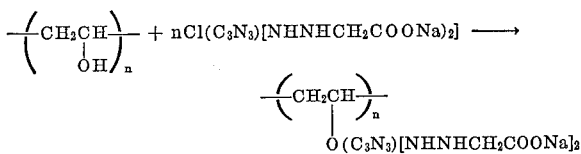

Thus it may be seen that it is the intent of this invention to include in the compounds of this invention, triazine derivatives of the formula

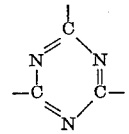

wherein at least one of the valencies is attached to a T group and at least one other valency is attached to a polymer.

Thus it may be seen that the Y groups may be any polymerizable group as well as a non-polymerizable group, and that thus the Y group itself may be a polymer or preformed polymer, and that the compounds of this invention can be classified as triazines having the structure,

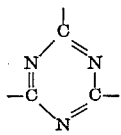

to which is attached at least one and no more than three T groups, in which the T groups are as defined hereinabove.

These coordination resins differ from the conventional ion-exchange resins. The conventional ion-exchange resins are polymer matrices to which are attached functional acidic, basic or salt groups which are electrovalent in nature and the resin exchanges ions by means of these groups in a manner similar to normal acids, bases or salts. The coordination resins are polymer matrices to which are attached functional groups capable of forming complexes with metal ions and metal salts through covalent linkages whereby more stable molecules are produced.

Coordination resins which contain in their structures substituents which function through the concerted action of salt forming groups and coordinating groups are sometimes considered as a special class of ion-exchange resins. However, it is well-known that the conventional ion-exchange resins are incapable of recovering heavy metal ions from solution containing a higher concentration of alkali- and alkaline-earth ions because such resins function solely by ion-exchange involving electrovalent bonds, and their performance is determined by mass action laws. This may be illustrated using a cation exchange resin as an example. Such a resin contains a crosslinked polymer matrix to which are attached functional acidic groups; such polymers may be regarded as insoluble acids. Undoubtedly, the most widely used ion-exchange resin today is the cation resin described in my U.S. Patent 2,366,007 (1944) and is a sulphonated styrene-divinyl benzene polymer which may be represented by R—SO$_3$H, wherein R is the polymer matrix and —SO$_3$H, represents the sulfonic acid groups attached to the benzene rings in the polymer. These polymers will form salts and will exchange its cations with the ion in solution. Thus the sodium form of the ion-exchange resin may be used to soften hard water by exchanging its sodium ions for the calcium and magnesium ions in solution, and because the process is one of ion exchange, leak-through of the calcium or magnesium ions will occur much before all of the sodium in the resin has been exchanged for the calcium or magnesium and the resin will have to be regenerated. The spent resin is regenerated using sodium chloride solutions which direct the equilibrium to reform the sodium salt of the polymer. From the foregoing it is obvious that the cation exchange resin would be incapable of removing small quantities of calcium or magnesium from solutions containing sodium chloride in higher concentrations than the concentration of calcium or magnesium, or that they could remove small quantities of cupric or other heavy metal ions from sodium chloride solution. It has been shown experimentally that in a column, the sodium salt of these resins shows little or no ability to remove copper from a 3% sodium chloride solution containing 250 parts per million of cupric ion.

In contrast to this, the coordination resins of this invention containing at least one T group per triazine ring, are able to remove the copper quantitatively from these sodium chloride solutions, and the copper derivative of these coordination resins are not regenerated to the sodium salt by sodium chloride. These results point to the utility of these resins capable of complexing metal cations by coordinations without depending on ion-exchange phenomena, not only in research and in the recovery of metals from processing wastes or from dilute solution, or for the purification of medicinals, food and industrial products or for the control of pollution but also for carrying out such process in the presence of high concentration of alkaline and alkaline-earth salts such as sodium chloride, potassium chloride, calcium chloride, magnesium chloride, etc., and for the separation of these heavy metal cations from each other.

These chelating resins, as is the case in ion-exchange resins can be prepared as small discreet particles in granular or bead forms and in these forms are used in columns or containers through which the solution containing the metal ions to be recovered or exchanged is passed. Initially, at the beginning of the process the resin efficiency is high and high rates of flow can be used. As the capacity of the resin is decreased its efficiency is decreased. Since, in the solid polymer, the rate of the exchange or the coordination reaction is diffusion-controlled, the functional groups in the inside of the mass of the polymer are not utilized efficiently unless the rate of the flow of the solution through the bed of polymer particles is sufficiently low. When the capacity of the polymer is exhausted or leak-through occurs, the process is interrupted and the resin regenerated.

The coordination resins of this invention can also be prepared in other forms such as in open pore structures such as are obtained by impregnating open-pore natural sponges or synthetic cellulose sponges or polyurethane foams with the soluble, fusible condensation products and thereafter insolubilizing the condensation products in situ. Or they can be prepared in the form of sheets or membranes by impregnating cellulose pulp or paper, cotton mats, wood pulp, fiber board, sawdust board, cotton in the form of mats, woven fabrics, etc., with the intermediate stage of the condensation resins and thereafter insolubilized in situ. Likewise porous ceramic beads, slabs, tubes, etc., derived from fused alumina, silica, etc., can be impregnated with the soluble, fusible condensation products and cured in situ.

The coordination resins can also be prepared in filamentary form by coating or impregnating fibers such as cotton, regenerated cellulose, polyvinyl alcohol, homo- and copolymer fibers, etc., with the condensation resins of this invention and then insolubilizing the product in situ. The filamentary form of these new resins of this invention are particularly useful in treating very dilute solutions of metals. In the treatment of very dilute solution, the costly handling of large volumes of solution to recover small quantities of metal, which, together with the high attrition loss of the granular polymer, makes the process uneconomical, as for example, to recover one part of copper from a solution containing 250 parts of copper per million, it is necessary to process 4000 pounds of the solution, whereas if the solution contains only 100 parts of copper per million, then 10,000 pounds of solution must be treated. The use of the filamentary form eliminates some of the problems associated with the conventional granular processes by (1) preparing and using insoluble coordination polymers in filamentary form rather than in the form of discrete particles or membranes and (2) contacting the solution with the coordination resin in filamentary form. A further improvement consists in contacting the solution containing the metal cations with a new surface of the filamentary coordination polymer before substantial exhaustion of the capacity of the coordination polymer occurs by advancing the filamentary polymer intermittently or continuously is desired or required. Furthermore, the solution may be treated in a batch process or in a continuous-flow system. Further improvements and modifications of the process of this invention include the continuous regeneration of the filamentary coordination resin as well as a continuous cyclic system which comprises contacting the solution of metal cations with the filamentary coordination polymer, regenerating the coordination polymer and recontacting a solution containing the metal cations with the regenerated coordination polymer.

The filamentary form of the coordination polymers used in the practice of this invention may be prepared and used in various forms depending upon the particular use desired and economic considerations. They may be prepared as single solid continuous-filaments similar to the commercial monofilament fishing lines of various diameters from about .005″ to .05″ or higher in diameter; or in smaller diameters, which may be braided, twisted or woven into soft, pliable multifilament lines of various diameters. They may also be used in the form of hollow lines to increase the buoyancy of the filament, or in the form of a solid or hollow ribbon. Where long lengths of the filamentary coordination polymers are to be used in the process of this invention, and where there is danger of breakage due to the weight of unsupported polymer exceeding or approaching the limit of the tensile strength of the coordination polymer, the polymer may be reinforced by use of a reinforcing core of another filament such as another fiber, strands of fibers, wire, strands of wire or by forming a mixed, twisted, braided or woven filament with other reinforcing filaments. In other cases, the coordination polymer may be used as a coating on a core of fiber, fibers or wire. The choice of the specific form depends on the methods used in preparing the filamentary coordination polymer from the intermediate available as well as the cost of the particular form prepared and the specific use made of the filamentary coordination polymer.

The behavior of the coordination groups in the compounds and resins of this invention is determined by their stability constants. Thus, when a coordinating group as illustrated by a mole of

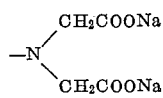

reacts by contact with a solution containing a mole of copper chloride, $CuCl_2$, the chelate structure,

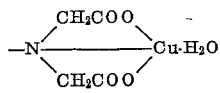

will form, and with a solution of a mole of nickel chloride, $NiCl_2$, the structure,

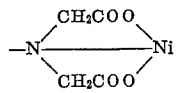

will form, and in another solution containing ½ mole of $CuCl_2$ and ½ mole of $NiCl_2$, one-half mole of each of these chelate structures will be formed. On the other hand, if a coordinating group having a mole of imino diacetic acid coordinating groups is reacted with a solution containing one more of copper chloride and one mole of nickel chloride, only the copper chelate will form because the stability constant of the copper chelate ($K_1$ is about $3.5 \times 10^{10}$) is greater than that of the nickel chelate ($K_1$ is about $2.75 \times 10^7$), and, for the same reason, if the nickel-chelated polymer is immersed in a solution of copper ion, the nickel will be replaced by copper and nickel will go into solution, even though thee metal chelates are not regenerated by alkali ions.

For the iminoacetic acid group the qualitative order of selectivity is $Pd^{+2} > Cu^{+2} > Fe^{+2} > Ni^{+2} > Pb^{+2} > Mn^{+2} > Ca^{+2}$. Thus, if a mole of each ion is in solution, seven moles of iminoacetic acid groups will be required on the polymer to react with the six heavy metal ions and they will be absorbed simultaneously if sufficient iminoacetic acid groups are in contact with the solution, but if only one mole of iminoacetic acid groups is in contact with the solution, then only the lead is removed, and if two moles of iminoacetic acid are in contact with the solution, then lead and copper are removed, and if three moles of iminoacetic acid groups are in contact with the solution, then lead, copper and iron are removed, and similarly for 4, 5, 6, etc., number of metals.

In the triazine derivatives, the activity of a coordinating group, such as

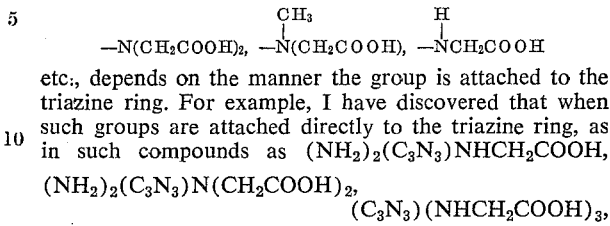

etc., depends on the manner the group is attached to the triazine ring. For example, I have discovered that when such groups are attached directly to the triazine ring, as in such compounds as $(NH_2)_2(C_3N_3)NHCH_2COOH$, $(NH_2)_2(C_3N_3)N(CH_2COOH)_2$, $$(C_3N_3)(NHCH_2COOH)_3,$$

$(C_3N_3)(NCH_2COOH)_3$, the coordination tendency of the aminoacid nitrogen is greatly reduced and that the substituent group functions more nearly as a carboxylic acid forming primarily electrovalent bonds; while the exact reason for this behavior is not thoroughly known, it may be explained on the basis that the basicity of the amino acid nitrogen has been greatly reduced by the attachment to the carbon atom in the triazine ring. Whether or not this theory explains this phenomenon satisfactorily, I have now discovered that if the amino nitrogen of the amino acid is attached to the carbon atom of a triazine ring by means of another atom or group of atoms so as to preserve the basicity of the amino nitrogen of the amino acid, then the coordination tendency of the amino acid is maintained. Accordingly, therefore, the T groups attached to the triazine ring are substituted amino acids in which at least one amino group is basic. These properties are found in the T groups defined hereinabove having the general formulas,

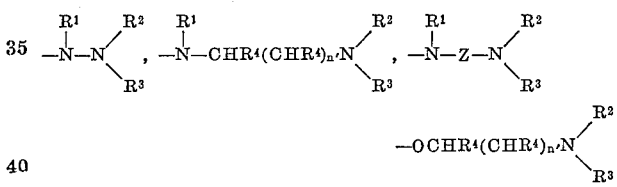

and

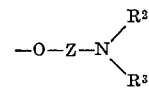

wherein $R^1$, $R^2$, $R^3$, $R^4$, Z and $n'$ are as defined hereinabove.

The following examples illustrate the practice of this invention and are given by way of illustration and not by limitation. Unless specifically indicated otherwise, the parts and percentages are intended as parts by weight and percentages by weight, respectively.

EXAMPLE I

A slurry of cyanuric chloride is prepared by running a thin stream of a hot solution of 184.4 g. of cyanuric chloride in 400 ml. of acetone into 600 ml. of stirred mixture of ice and water (0–5° C.), and 366 parts of $NH_2NHCH_2COONa$ added and the temperature raised slowly to 45° C., followed by the addition of 166 parts of $Na_2CO_3$ and the mixture heated to reflux for two hours, cooled, acidified with dilute $H_2SO_4$ and cooled to 5° C.; the triazine is removed by filtration. The filtrate is evaporated to dryness and extracted with anhydrous ethyl alcohol to recover addition product and there is obtained an almost quantitative yield of

which, on analysis for C, H and N gives values of 31.21% C, 4.45% H, and 36.28% N, which values are in good agreement with the theoretical values for the compound.

EXAMPLE II

The procedure of Example I is repeated using 576 parts of $NH_2N(CH_2COONa)_2$ and there is obtained the compound $(C_3N_3)[NHN(CH_2COOH)_2]_3$ which on analyses for C, H, and N gives values of 34.61%, C, 4.04% H, and 24.2% N, which values are in close agreement with the theoretical values for the compound.

EXAMPLE III

To 750 ml. of water there is added 163 parts of $NC(CN)Cl_2$ (prepared by the procedure of J.A.C.S., 73, 2981 (1951) and 384 parts of $NH_2N(CH_2COONa)_2$, and the mixture refluxed for two hours during which time a 5% NaOH solution was added at such a rate as to maintain the solution neutral or slightly so as indicated by phenolphthalein indicator in the solution. The triazine derivative is then isolated by the procedure of Example I and there is obtained the compound $$NH_2C_3N_3NH[N(CH_2COOH)_2]_2$$

EXAMPLE IV

The procedure of Example III is repeated using 144 parts of $(NH_2)_2(C_3N_3)Cl$ prepared by the procedure of J.A.C.S., 73, 2981 (1951), and 192 parts of $$NH_2N(CH_2COONa)_2$$

and there is obtained the compound $$(NH_2)_2(C_3N_3)NHN(CH_2COOH)_2$$

EXAMPLE V

The procedure of Example IV is repeated using 162 parts of $(CH_3NH)_2C_3N_3Cl$ (prepared by the procedure given in J.A.C.S., 73, 2981 (1951), and there is obtained the compound, $(CN_3NH)_2(C_3N_3)NHN(CH_2COOH)_2$.

EXAMPLE VI

The procedure of Example IV is repeated using 270 parts of $(NH_2)(H_2NO_2SC_6H_4NH)(C_3N_3)Cl$, prepared by the method of J. Org. Chem., 24, 643 (1956), and J.A.C.S., 73, 2981 (1951) and there is obtained the compound $$(NH_2)(H_2NO_2SC_6H_4NH)(C_3N_3)NHN(CH_2COOH)_2$$

EXAMPLE VII

The procedure of Example IV is repeated using 203 parts of $(NH_2)(NH_2CONHNH)(C_3N_3)Cl$ (prepared by the method of U. S. Patent 2,295,562) there is obtained the compound, $$(NH_2)(NH_2CONHNH)(C_3N_3)NHN(CH_2COOH)_2$$

EXAMPLE VIII

The procedure of Example III is repeated using 209 parts of $HOCH_2CH_2NH(C_3N_3)Cl_2$ prepared by the procedure of J.A.C.S., 73, 2986 (1951), and there is obtained the compound $$HOCH_2CH_2NH(C_3N_3)[NHN(CH_2COOH)_2]_2$$

EXAMPLE IX

The procedure of Example IV is repeated using 233 parts of $(HOCH_2CH_2NH)_2C_3N_3Cl$ prepared by the procedure of J.A.C.S., 73, 2986 (1951), and there is obtained the compound $$(HOCH_2CH_2NH)_2C_3N_3NHN(CH_2COOH)_2$$

EXAMPLE X

The procedure of Example III is repeated using 344 parts of $(HOCH_2CH_2)_2N(C_3N_3)(Cl_2)$, prepared by the procedure of J.A.C.S., 73, 2986 (1951), and there is obtained the compound $$(HOCH_2CH_2)_3N(C_3N_3)[NHN(CH_2COOH)_2]_2$$

EXAMPLE XI

The procedure of Example IV is repeated using 285 parts of $(NaOOCCH_2NH)_2C_3N_3Cl$ (prepared by the procedure of J. Org. Chem., 24, 643 (1959)) and there is obtained the compound $$(HOOCCH_2NH)_2(C_3N_3)NHN(CH_2COOH)_2$$

EXAMPLE XII

The procedure of Example III is repeated using 267 parts of $CH_2=CHC_6H_4NH(C_3N_3)Cl_2$ (prepared by the procedure of J.A.C.S., 73, 2981 (1951)) using $$CH_2=CHC_6H_4NH_2+(C_3N_3)Cl_3$$

and there is obtained the compound $$CH_2=CHC_6H_4NH(C_3N_3)[NHN(CH_2COOH)_2]_2$$

EXAMPLE XIII

The procedure of Example IV is repeated using 330 parts of $(CH_2=CHC_6H_4NH)_2(C_3N_3)Cl$ (prepared by the procedure given in J.A.C.S., 73, 2986 (1951)) and there is obtained the product $$(CH_2=CHC_6H_4NH)_2(C_3N_3)NHN(CH_2COOH)_2$$

EXAMPLE XIV

The procedure of Example III is repeated using 269 parts of $CH_2=CHC_6H_4O(C_3N_3)Cl_2$ (prepared from $CH_2=CHC_6H_4ONa$ and $(C_3N_3)Cl_3$, using the procedure of J.A.C.S., 73, 2989 (19551)), and there is obtained the compound $$CH_2=CHC_6H_4O(C_3N_3)[NHN(CH_2COOH)_2]_2$$

When the procedure of Example IV is repeated using 334 parts of $(CH_2=CHC_6H_4O)_2(C_3N_3)Cl$, there is obtained the compound $$(CH_2=CHC_6H_4O)_2(C_3N_3)NHN(CH_2COOH)_2$$

EXAMPLE XV

The procedure of Example IV is repeated using 227 parts of $(CH_2=CHCH_2O)_2(C_3N_3)Cl$ (prepared from $CH_2=CHCH_2OH$ and $(C_3N_3)Cl_3$ according to J.A.C.S., 73, 2988 (1951), and there is obtained the compound $$(CH_2=CHCH_2O)_2(C_3N_3)NHN(CH_2COOH)_2$$

EXAMPLE XVI

The procedure of Example IV is repeated using 311 parts of $(CH_2=CHCH_2OOCCH_2O)_2C_3N_3Cl$ (prepared from $HOCH_2COOCH_2CH=CH_2$ according to J.A.C.S., 73, 2988 (1951)) and there is obtained the compound $$(CH_2=CHCH_2OOCCH_2)_2(C_3N_3)NHN(CH_2COOH)_2$$

EXAMPLE XVII

The procedure of Example II is repeated at 5° C. using 384 g. of $NH_2N(CH_2COONa)_2$, 184 g. of cyanuric chloride in acetone, and 106 g. of $Na_2CO_3$, and there is obtained the compound $$Cl(C_3N_3)[NHN(CH_2COONa)_2]_2$$

Then there is added 376 parts of $H(OCH_2CH_2)_8OH$ and 40 g. of NaOH; the mixture refluxed for one hour and there is obtained a solution of the compound $$H(OCH_2CH_2)_8O(C_3N_3)[NHN(CH_2COONa]_2$$

EXAMPLE XVIII

Example XVII is repeated to form the $$Cl(C_3N_3)[NHN(CH_2COONa)_2]_2$$

compound, then there is added 68 g. of ethylene diamine and the mixture refluxed for two hours. There is obtained the compound $$[(NaOOCCH_2)_2NNH]_2(C_3N_3)NHCH_2CH_2NH(C_3N_3)[NHN(CH_2COONa)_2]_2$$

EXAMPLE XIX

Example XVII is repeated to prepare the $$Cl(C_3N_3)[NHN(CH_2COONa)_2]_2$$

compound, and there is added 43 g. of ethylene imine and the mixture heated to 45° C. for 30 minutes, while a dilute solution of NaOH is added to maintain neutrality. There is obtained in solution the compound

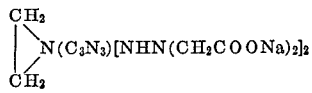

EXAMPLE XX

A slurry of 368 g. of cyanuric chloride in 800 ml. of acetone and 1200 ml. of water are reacted with 440 parts of $(NH_2)(SO_3Na)C_6H_3CH=CHC_6H_3(SO_3Na)(NH_2)$ and 106 parts of $Na_2CO_3$ at 10–15° C. There is obtained the intermediate in theoretical yield,

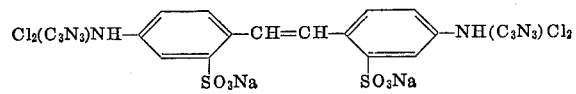

with 384 g. of $NH_2N(CH_2COONa)_2$, according to the procedure of Example III, and there is obtained the compound

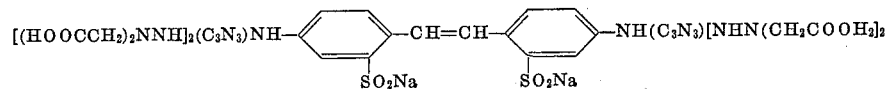

which showed marked fluorescent properties. The other half of this compound is first reacted with ammonia by the procedure of J.A.C.S., 73, 2981 (1951), and then with 192 parts of $NH_2N(CH_2COONa)_2$ by the procedure of Example IV, and there is obtained the compound

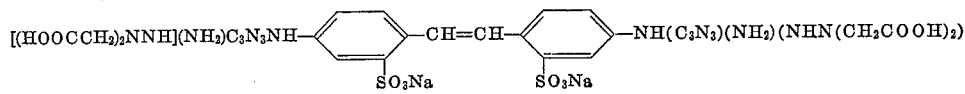

which also has marked fluorescent properties.

EXAMPLE XXI

A mixture of 141 parts of $(NH_2)_2(C_3N_3)(NHNH_2)$, 222 parts of $ClCHCOONa$, and 80 parts of NaOH dissolved in 750 parts of water and refluxed for one hour. There is obtained a solution of the compound

EXAMPLE XXII

The procedure of Example II is repeated using 260 parts of $(CH_2=CHC_6H_3NH)(C_3N_3)Cl_2$, 240 parts of $HCl.NH_2N(CH_2COOC_2H_5)_2$, and 80 parts of NaOH, and there is obtained the compound

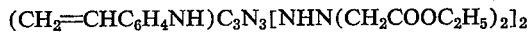

When 260 parts of $(CH_2=CHC_6H_4O)(C_3N_3)Cl_2$ are used instead of the vinylanilidotriazine there is obtained the compound

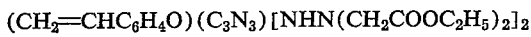

By these and related procedures such as given in J.A.C.S., 73, 2981–3008 (1951), J. Org. Chem., 24, 643 (1959), J. Org. Chem., 25, 202 (1960), Macromoleculare Chemie, 37, 25 (1960), the compounds of this invention, shown in Table 1, can be readily prepared.

TABLE 1

| T Group | Y Groups | |
|---|---|---|
| —NHN(CH$_2$COOH)$_2$ | $-\overset{O}{\underset{OC_2H_5}{P}}-OC_2H_5$ | $-\overset{O}{\underset{OC_2H_5}{P}}-OC_2H_5$ |
| —NHN(CH$_2$COOH)$_2$ | $-\overset{O}{\underset{ONa}{P}}-ONa$ | $-\overset{O}{\underset{ONa}{P}}-ONa$ |
| —NHN(CH$_2$COOH)$_2$ | $-\overset{O}{\underset{OCH_2CH=CH_2}{P}}-OCH_2CH=CH_2$ | $-\overset{O}{\underset{OCH_2CH=CH_2}{P}}-OCH_2CH=CH_2$ |
| —NHN(CH$_2$COOH)$_2$ | —Cl | —OH |
| —NHN(CH$_2$COOH)$_2$ | —OH | —OH |
| —NHN(CH$_2$COOH)$_2$ | —NHC$_{12}$H$_{25}$ | —NHC$_{12}$H$_{25}$ |
| —NHN(CH$_2$COOH)$_2$ | —N(C$_{12}$H$_{25}$)$_2$ | —N(C$_{12}$H$_{25}$)$_2$ |
| —NH—CH(CH$_2$COOH)COOH | —NHCH(CH$_2$COOH)COOH | —NHCH(CH$_2$COOH)—COOH |
| —NHC$_2$H$_4$N(CH$_2$COOH)$_2$ | —NHCH$_2$CH=CH$_2$ | —NHCH$_2$CH=XH$_2$ |
| —NHC$_2$H$_4$N(CH$_2$COOH)$_2$ | —NHCH$_2$CH$_2$OOCCH=CH$_2$ | —NHCH$_2$CH$_2$OOCCH=CH$_2$ |
| —NHC$_2$H$_4$N(CH$_2$COOH)$_2$ | —OC$_6$H$_4$SO$_3$Na | —OC$_6$H$_4$SO$_3$Na |
| —NHC$_2$H$_4$N(CH$_2$COOH)$_2$ | $-N\begin{smallmatrix}CH_2\\ \\CH_2\end{smallmatrix}$ | $-N\begin{smallmatrix}CH_2\\ \\CH_2\end{smallmatrix}$ |
| —N(CH$_3$)—N[CH(CH$_3$)COOH]$_2$ | —NHC$_{12}$H$_{25}$ | —NHC$_6$H$_4$SO$_3$Na |
| —N(C$_6$H$_5$)—NH—C(C$_6$H$_5$)—COOLi | —NHC$_6$H$_5$ | —NHC$_6$H$_5$ |
| —N(CH$_2$COONa)—N(CH$_2$COONa)CH$_2$COONa | —N(CH$_3$)$_2$ | —N(CH$_3$)$_2$ |

TABLE 1—Continued

| T Group | Y Groups | |
|---|---|---|
| —NH(CH₂)₆NHCH₂COOH | —NH(CH₂)₆NHCH₂COOH | —NH(CH₂)₆NHCH₂COOH |
| —NH(CH₂)₆N(CH₂COOH)₂ | —NH(CH₂)₆N(CH₂COOH)₂ | —NH(CH₂)₆N(CH₂COOH)₂ |
| —NC₆H₄N(H)(CH₂COONa)(CH₂COONa) | —N(C₆H₅)₂ | —NHC₆H₄CH=CH₂ |
| —OC₆H₃(CH₂)N[C(CH₃)(COOH)][C(CH₃)(COOH)] | —N(C₂H₅)₂ | —OC₆H₄CH=CH₂ |
| —OCH₂CH₂N(CH₂COOH)₂ | —NH₂ | —NH₂ |
| —OCH(CH₃)CH₂N(CH₂COOK)₂ | —NH₂ | —NH₂ |
| —OCH(CH₃)CH₂N(CH₂COOK)₂ | —NHC₆H₄OH | —NHC₆H₄OH |
| —OCH(CH₃)CH₂N(CH₂COOK)₂ | —NHC₆H₄As(=O)(—OH)₂ | —NHC₆H₄As(=O)(—OH)₂ |
| —OCH(CH₃)CH₂N(CH₂COOK)₂ | —NHCH₂COOCH₃ | —NHCH₂COOCH₃ |
| —NH—N(CH₂COOC₂H₅)₂ | —NHN(CH₂COOC₂H₅)₂ | —OC₆H₄CH=CH₂ |
| —NNN(CH₂COOC₂H₅)₂ | —NHN(CH₂COOC₂H₅)₂ | —NC₆H₄CH=CH₂ |
| —NHN(CH₂COOC₆H₅)₂ | —OC₆H₄CH₂CH=CH₂ | —OC₆H₄CH₂CH=CH₂ |
| —NHN(CH₂COOH)₂ | —NHN(CH₂COOH)₂ | —N(CH₂COOCH₂CH=CH₂)(CH₂COOCH₂CH=CH₂) |
| —NHCH₂CH₂N(CH₂COOCH₃)₂ | —NHC₆H₄C(CH₃)=CH₂ | —NHC₆H₄C(CH₃)=CH₂ |
| —HNN(CH₂COOH)₂ | —Cl | —Cl |
| —NH(CH₂)₂(CH₂COOH)₂ | —Cl | —Cl |
| —NH(CH₂)₆(CH₂COOH)₂ | —Cl | —Cl |
| —NH(CH₂)₂(CH₂COOH)₂ | —Cl | —N(CH₃)₂ |
| —NH(CH₂)₂N(CH₂COOH)₂ | —OCH₃ | —OCH₃ |
| —NH(CH₂)₆N(CH₂COOH)₂ | —OC₆H₅ | —OC₆H₅ |
| —NHN(CH₂COOH)₂ | —OC₆H₅ | —OC₆H₅ |
| —NHN(CH₂COOH)₂ | —OC₂H₅ | —OC₂H₅ |
| —NHN(CH₂COOH)₂ | —NHCH₂CH₂OH | —NHCH₂CH₂OH |
| —NH(CH₂)₂N(CH₂COOH)₂ | —NHCH₂CH₂OH | —NHCH₂CH₂OH |
| —NH(CH₂)₆H(CH₂COOH)₂ | —NHCH₂CH₂OH | —NHCH₂CH₂OH |
| —NHC₆H₅N(CH₂COOH)₂ | —NHCH₂CH₂OH | —NHCH₂CH₂OH |
| —NHN(CH₂COOH)₂ | —NHC₆H₄CH=CH₂ | —NHC₆H₄CH=CH₂ |
| —NHCH₂CH₂N(CH₂COOH)₂ | —NHC₆H₄CH=CH₂ | —NHC₆H₄CH=CH₂ |
| —NH(CH₂)₆N(CH₂COOH)₂ | —NHC₆H₄CH=CH₂ | —NHC₆H₄CH=CH₂ |
| —NHCH₂CH₂N(CH₂COONa)₂ | —N(CH₂)(CH₂)(CH₃) (aziridine) | —N(CH₃)₂ |
| —NHCH₂CH₂N(CH₂COOK)₂ | —N(CH₂)(CH₂)(CH₃) (aziridine) | —N(C₄H₉)₂ |
| —NHN(CH₂COOH)₂ | —NHNH₂ | —NHNH₂ |
| —NHCH₂CH₂N(CH₂COOCH₃)₂ | —NHCH₂CHCH₂ (epoxide) | —NHCH₂CHCH₂ (epoxide) |
| —NHN(CH₂COONa)₂ | —NHCH₂CHCH₂ (epoxide) | —N(C₆H₅)₂ |
| —NH(CH₂)₆N(CH₂COOK) | —OCH₂CHCH₂ (epoxide) | —CH₂CHCH₂ (epoxide) |
| —NHN(CH₂COOLi)₂ | —NHC₆H₄CH₂CHCH₂ (epoxide) | —NHC₆H₄CH₂CHCH₂ (epoxide) |
| —NH(CH₂)₂N(CH₂COOH)₂ | —NH(CH₂)₂N(CH₂COOH)₂ | —NHCH₂CHCH₂ (epoxide) |
| —NH(CH₂)₆N(CH₂COOH)₂ | —NH(CH₂)₆N(CH₂COOH)₂ | —NHCH₂CHCH₂ (epoxide) |

TABLE 1—Continued

| T Group | Y Groups | |
|---|---|---|
| —NH(CH₂)₂N(CH₂COOH)₂ | —NHCH₂COOH | —NHCH₂COOH |
| —NH(CH₂)₂N(CH₂COOH)₂ | —NHCH₂CN | —NHCH₂CN |
| —NH(CH₂)₆N(CH₂COOH)₂ | —NHCH₂CONH₂ | —NHCH₂CONH₂ |
| —NH(CH₂)₆N(CH₂COOH)₂ | —SC₆H₅ | —SC₆H₅ |
| —NH(CH₂)₆N(CH₂COOH)₂ | —SCH₂CONH₂ | —SCH₂CONH₂ |
| —NHC₆H₄CH₂N(CH₂COOH)₂ | —NH(CH₂CH₂O)₈H | —NH(CH₂CH₂O)₈H |
| —NHC₆H₄N(CH₂COOH)₂ | —NHC₅H₅N | —NHC₅H₅N |
| 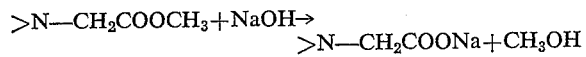 | —C₆H₅ | —C₆H₅ |
| 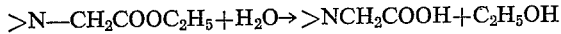 | —C₆H₁₁ | —C₆H₁₁ |
| —NHN(CH₂COOH)₂ | —Br | —Br |
| —NH(CH₂)₆N(CH₂COOH)₂ | —I | —I |
| —NHCH₂CH₂N(CH₂COOH)₂ | —NHCH₂CH₂OOCCH=CH₂ | —NHCH₂CH₂OOCCH=CH₂ |
| —NHCH₂CH₂N(CH₂COOH)₂ | —NHCH₂COOCH=CH₂ | —NHCH₂COOCH=CH₂ |
| —NHCH₂CH₂N(CH₂COOH)₂ | —NHCH₂COOCH₂CH=CH₂ | —NHCH₂COOCH₂CH=CH₂ |
| —NHCH₂CH₂N(CH₂COOH)₂ | —NHC₆H₄COOCH₂CH=CH₂ | —NHC₆H₄COOCH₂CH=CH₂ |
| —NHCH₂CH₂N(CH₂COOH)₂ | —NHC₆Cl₅ | —NHC₆Cl₅ |
| —NH(CH₂)₆N(CH₂COOH)₂ | —NHC₆H₄OCH₂CH=CH₂ | —NHC₆H₄OCH₂CH=CH₂ |
| —NH(CH₂)₆N(CH₂COOH)₂ | —NHC₆H₄NHCH₂CH=CH₂ | —NHC₆H₄CH₂CH=CH₂ |
| —NH(CH₂)₆N(CH₂COOH)₂ | —NHC₆H₄N(CH₂CH=CH₂)₂ | —NHC₆H₄N(CH₂CH=CH₂)₂ |
| 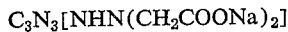 | —NH₂ | —NH₂ |
| —NH(CH₂)₂—N—CH₂CH₂N(CH₂COOH)₂<br>        CH₂COOH | —NHNHOCCH₃ | —NHNHOCCH₃ |
| —NH(CH₂)₂—N—CH₂CH₂N(CH₂COOH)₂<br>        CH₂COOH | —NHN—OCC₆H₅<br>     C₆H₅ | —NHNOCC₆H₅<br>    C₆H₅ |
| —NH(CH₂)₂N(CH₂COOCH₃) | —NHNHC₃N₃[N(CH₃)₂]₂ | —NHNHC₃N₃[N(CH₃)₂]₂ |
| —NH(CH₂)₂N(CH₂COOCH₃) | —NHCH₂CH₂C₃N₃[N(CH₃)₂]₂ | —NHCH₂CH₂C₃N₃[N(CH₃)₂]₂ |

The triazine compounds of this invention containing at least one T group wherein the —COOH group is in the acid form, may be used in the acid form or they can be used in the form of salts. The salts are readily obtained by reaction with bases such as NaOH, LiOH, Ca(OH)₂, Mg(OH)₂, KOH, etc., or the corresponding oxides where available such as CaO, MgO, etc., or the free acid may be converted to ammonium salts by reaction with ammonia and the substituted ammonias such as the amines, hydrazines, hydroxyl amines, etc., for example, ammonia methyl amine, ethyl amine, dibutyl amine, ethanol amine, diethanol amine, triethanol amine, hydrazine, N-methyl hydrazine, dimethyl hydrazine, phenyl hydrazine, ethylene diamine, diethylene triamine, phenylene diamine, pyridine, morpholine, piperazine, allyl amine, diallyl amine, propargyl amine, semicarbazide, guanidine, biguanidide, guanazole, trimethyl benzyl ammonium hydroxide, etc., as well as bases such as triphenyl phosphine, tributyl stilbine, etc. For other purposes the T group can possess the carboxyl structure in the form of an ester which is then hydrolyzed by acids and bases to produce the free acid or a salt, thus >N—CH₂COOCH₃+NaOH→
                >N—CH₂COONa+CH₃OH

>N—CH₂COOC₂H₅+H₂O→ >NCH₂COOH+C₂H₅OH

The new coordination compounds of this invention are readily prepared from the free acids of the new triazine of this invention and the corresponding oxides of the metal desired. However, they are more easily prepared by reacting a water soluble or water dispersible salt of the triazine compound with a water soluble metal derivative such as copper sulfate, nickel chloride, etc.

For example, when a solution of

C₃N₃[NHN(CH₂COONa)₂]

is treated with a solution of CuSO₄, a blue complex is formed which precipitates from the solution, whereas when a solution of a cobalt salt is used, a red, insoluble precipitate is obtained. These dried precipitates do not change color substantially on exposure to U.V. light or when heated to 100° C. for twenty-four to forty-eight hours. Also, when these metal salts are reacted with the compounds of Examples I to XVI inclusive, coordination complexes are similarly obtained. Furthermore, when solutions of silver, cadmium, aluminum, chromium, iron, zinc, lead, titanium, uranium, zirconium, vanadium, palladium, lanthanum, mercury, nickel, and manganese are used instead of copper and cobalt, coordination complexes are also obtained with the compounds of Examples I to XX inclusive.

EXAMPLE XXIII

Parts
(NH₂)₂(C₃N₃)-NHNHCH₂COOH _____ 20
Aqueous formaldehyde (37.2%) _____ 32 are heated together under reflux at the boiling point of the mixture for thirty minutes, yielding a condensation product that cures to an insoluble, infusible mass when a sample is heated on a hot plate at 150° C. Instead of heating the reactants under reflux, as described above, the mixture can be shaken or stirred for a longer period, for example, twenty-four to seventy-two hours or longer at room temperature, to effect reaction between the components and to obtain a soluble, fusible reaction product which can be heat-hardened. This condensation is performed preferably in the presence of an alkaline condensation catalyst, such as sodium hydroxide, sodium carbonate, ammonia, triethanolamine, hexamethylene tetraamine, etc., and cured in the presence of acidic curing catalyst, or catalysts which under the influence of the reaction or heat produce acidic substances, such as acetic acid, phthalic acid, ammonium phosphate, ammonium chloride, glycine, chloroacetamide, chloroacetyl urea, etc.

EXAMPLE XXIV

Parts
(NH₂)₂(C₃N₃)NHNHCH₂COOH _____ 40
Aqueous formaldehyde (37.2% CH₂O) _____ 32 are heated together under reflux at the boiling point of the mixture, yielding a condensation product, a sample of which cures to an insoluble, infusible state when a sample is heated at 130–150° C. on a hot plate. The remainder of the solution is neutralized with 10% NaOH to give the sodium salt of the condensation product, a sample of which also cures on the hot plate to an insoluble, infusible state at 130–150° C. To the remainder of the solution is added 16 parts of CuSO$_4$ in a 10% aqueous solution, and there is obtained the copper coordination compound of the resin having the linkages

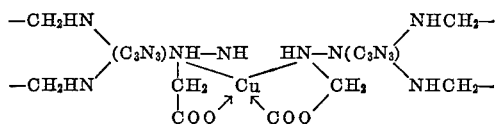

which is bright-blue in color. A sample of the copper derivative of the resin is also converted to the insoluble, infusible state by heating at 130–150° C.

Coordination compounds are also formed when cobalt, nickel, iron, zinc, and cadmium ions are added to the sodium salt of the condensation product.

EXAMPLE XXV

| | Parts |
|---|---|
| (CH$_3$NH)$_2$(C$_3$N$_3$)NHN(CH$_2$COON)$_2$ | 62.6 |
| Aqueous CH$_2$O (37.5%) | 24.0 |
| NaOH in 10 parts H$_2$O | 0.2 |

The above ingredients are refluxed for fifteen minutes to produce a resin dispersion which, when dehydrated, produces a clear, viscous resin and which, on heating to 140° C., becomes hard and infusible. In many cases, it is desirable to condense this and other triazines with melamine and formaldehyde, or with urea and formaldehyde, phenol and aldehydes, etc., as shown in some of the subsequent examples.

When an equivalent amount of glyoxal is used in this example, faster curing of the resin is obtained.

EXAMPLE XXVI

| | Parts |
|---|---|
| NH$_2$(C$_3$N$_3$)[NHN(CH$_2$COOH$_2$]$_2$ | 54 |
| Urea | 54 |
| Aqueous CH$_2$O (37.5% CH$_2$O) | 130 |

The above ingredients are refluxed for twenty-five minutes to produce a clear syrup. On dehydration it cures slowly at 140° C., but on the addition of 5 parts NH$_4$Cl, the cure is accelerated. The addition of 80 parts of alpha flock to the syrup produces a molding compound, which, after being dried at 70° C. has an excellent cure and good flow when molded at 135° C. for four minutes. The product has a glossy surface and is light-colored. When an equivalent amount of thiourea is substituted in the above formula, the type of cure, molding characteristics, and appearance of the molded product obtained is substantially the same as with that of urea.

EXAMPLE XXVII

| | Parts |
|---|---|
| (NH$_2$)$_2$(C$_3$N$_3$)NHN(CH$_2$COONa)$_2$ | 142 |
| Paratoluene sulfonamide | 57 |
| Aqueous CH$_2$O (37.5% CH$_2$O) | 190 |

The above ingredients are refluxed for one hour to produce a syrup which is clear while hot and cloudy on cooling.

EXAMPLE XXVIII

| | Parts |
|---|---|
| (NH$_2$)$_2$(C$_3$N$_3$)NHN(CH$_2$COOLi)$_2$ | 142 |
| Aqueous CH$_2$O (37.5% CH$_2$O) | 190 |
| Phenol | 29 |

The above ingredients are refluxed for twenty-five to thirty minutes to give a clear syrup when hot. At 135° C. the syrup has a prolonged cure but when 7.5 parts of chloroacetamide are added to the composition, an excellent cure is obtained.

EXAMPLE XXIX

| | Parts |
|---|---|
| (NH$_2$)$_2$(C$_3$N$_3$)NHN(CH$_2$COOH)$_2$ | 95 |
| Melamine | 63 |
| Aqueous CH$_2$O (37.5% CH$_2$O) | 220 |

The above mixture is refluxed for fifteen minutes. The syrup is clear when hot, when dehydrated cures alone at 135–140° C.

EXAMPLE XXX

| | Parts |
|---|---|
| (NH$_2$)$_2$(C$_3$N$_3$)NHN(CH$_2$COONa)(CH$_2$COONa) | 140 |
| Dimethylol urea | 550 |
| NH$_3$ (in 2.5 parts H$_2$O) | 5 |
| H$_2$O (distilled) | 1000 |
| NaOH (in 10 parts H$_2$O) | 0.5 |

The above components are mixed and refluxed for fifteen minutes. The syrup does not cure well alone at 135° C., but the addition of 8 parts of chloroacetamide accelerates the cure.

EXAMPLE XXXI

| | Parts |
|---|---|
| (H$_2$N)(H$_2$NO$_2$SC$_6$H$_4$NH)(C$_3$N$_3$)NHN(CH$_2$COONa)$_2$ | 130 |
| Aqueous CH$_2$O (37.5% CH$_2$O) | 210 |
| NH$_3$ in 5 parts H$_2$O | 2 |
| Aqueous trimethylol melamine (50% solu.) | 130 |

When the above ingredients are refluxed for twenty to thirty minutes a syrup is obtained which cures slowly alone. The cure is accelerated by ammonium chloride to produce hard resins and molding compounds.

EXAMPLE XXXII

| | Parts |
|---|---|
| (NH$_2$)(NH$_2$CONHNH)(C$_3$N$_3$)NHN(CH$_2$COOH)$_2$ | 130 |
| Aqueous CH$_2$O (37.5% CH$_2$O) | 130 |
| Glycerine | 10 |

The above mixture is refluxed for twenty-five to thirty minutes to produce a clear resin curing at 135–140° C., which cure is accelerated by the addition of curing agents.

EXAMPLE XXXIII

| | Parts |
|---|---|
| (NH$_2$)$_2$(C$_3$N$_3$)NHN(CH$_2$COOH)$_2$ | 125 |
| Aqueous CH$_2$O (37.5% CH$_2$O) | 150 |
| Butyl alcohol | 100 |

These ingredients are mixed and refluxed for one-half hour to produce a clear syrup which cures slowly at 135° C. After reflux, the water is removed from the reaction product by azeotroping the mixture and returning the butyl alcohol to the reaction. The butylated resin is reacted with heat-convertible alkyd resins for coating and enamels of excellent color retention and durability.

EXAMPLE XXXIV

| | Parts |
|---|---|
| (NH$_2$)$_2$C$_3$N$_3$NHN(CH$_2$COOH)$_2$ | 120 |
| Aqueous CH$_2$O (37.5% CH$_2$O) | 150 |
| Diethyl malonate | 20 |
| NaOH in 20 parts H$_2$O | 2.5 | are refluxed for twenty minutes to produce a condensation product which cures at 140–160° C.

EXAMPLE XXXV

| | Parts |
|---|---|
| (NH$_2$)$_2$(C$_3$N$_3$)NHN(CH$_2$COONa)$_2$ | 120 |
| Aqueous CH$_2$O (37.5% CH$_2$O) | 140 |
| NH$_3$ in 5 parts H$_2$O | 4.0 |
| Acetamide | 15.0 |

The above mixture is refluxed for fifteen minutes to produce a clear syrup which cures alone at 135° C. With phthalic anhydride, chloroacetamide and ammonium chloride, respectively, the cure is accelerated.

EXAMPLE XXXVI

| | Parts |
|---|---|
| $((NA_2)_2(C_3N_3)NHNHCH_2COO)_2Zn$ | 65 |
| Acrolein | 38 |
| NaOH in 5 parts $H_2O$ | 0.2 |

The reactants are mixed and refluxed for fifteen minutes to produce a syrup which cures at 140° C. to a hard tough resin by the addition of ammonium chloride.

EXAMPLE XXXVII

| | Parts |
|---|---|
| Shellac | 50 |
| $HOOCCH_2NHNH—(C_3N_3)(NHCH_2OH)_2$ | 15 |

The dimethylol derivatives are prepared in accordance with the low temperature procedure of Example XXIII. The above components are mixed well and fused at 150° C. At this temperature, the mixture cures to a hard, infusible resin. The addition of paraform and hexamethylene tetraamine, respectively, hastens the cure.

EXAMPLE XXXVIII

| | Parts |
|---|---|
| Alkyd resin (e.g. glyceryl phthalate) | 50 |
| $HOOCCH_2NHNH(—C_3N_3)(NHCH_2OH)_2$ | 15 |

These components are mixed together and heated on a hot plate at 150° C. and cures to a hard, infusible product. The curing is accelerated by paraform.

EXAMPLE XXXIX

| | Parts |
|---|---|
| 1-phenyl guanazole | 35 |
| Aqueous formaldehyde (37.5% $CH_2O$) | 35 |
| Ammonia (28%) | 2 |
| Aqueous NaOH (0.5 N) | 0.75 | are heated together under reflux for five minutes at the end of which period separation of a resinous mass occurs. This resin is used satisfactorily for the production of molding compounds.

EXAMPLE XL

| | Parts |
|---|---|
| Soya bean protein | 25 |
| Aqueous ammonia (28% $NH_3$) | 2.5 |
| Aqueous NaOH (0.5 N) | 3.0 |
| Aqueous $CH_2O$ (37.5% $CH_2O$) | 140 |
| $(NH_2)_2(C_3N_3)NHN(CH_2COONH_4)_2$ | 80 | are heated together under reflux at the boiling point of the mixture for twenty minutes. The resin cures well when dehydrated and heated at 130° C.

EXAMPLE XLI

| | Parts |
|---|---|
| $(NH_2)_2(C_3N_3)NHN(CH_2COO)_2Mg$ | 100 |
| Aldol | 100 | are mixed together and then heated for forty hours at 60° C. The resinous material thereby obtained melts on a hot plate at 140° C., and is converted to an insoluble, infusible state by further heating.

EXAMPLE XLII

The procedure of Example XXIV is repeated using 51.4 parts of

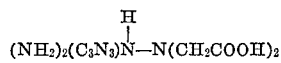

and 64 parts of aqueous 37.5% $CH_2O$, and the resin dehydrated and tested. The dissociation constants, using the method given in J.A.C.S., 74, 5052 (1952) as determined qualitatively are about $k_1=4.5\times10^{-4}$ and $k_2=6.6\times10^{-10}$. Separate samples of the condensation product are neutralized with NaOH, KOH, LiOH, CsOH, Ca(CH)$_2$, Ba(OH)$_2$, and Sr(OH)$_2$ respectively, to give the corresponding salts of polymer products.

EXAMPLE XLIII

The procedure of Example XXIV is repeated using 51.4 parts of $(NH_2)_2(C_3N_3)NHN(CH_2COOH)_2$ and 64 parts of aqueous 37.5% $CH_2O$ and separate samples of the condensation product is neutralized with ammonia, hydrazine, N-methyl hydrazine, dimethyl hydrazine, methyl amine, ethyl amine, butyl amine, diisopropyl amine, tributyl amine, ethylene diamine, diethylene triamine, ethanol amine, diethanol amine, triethanol amine, aniline, phenylene diamine, aminophenol, dimethyl amine, pyridine, morpholine, polyethylene imine (MW 300), piperidine, hexamethylene diamine, tetramethylene diamine, allyl amine, and propargyl amine and the corresponding salts are obtained.

EXAMPLE XLIV

The procedure of Example XLII is repeated and the product of the condensation is poured into a glass tray and placed in an oven heated to 100° C. for twelve hours, followed by heating at 130° C. for six hours. The product is crushed into granules of about 50 mesh and immersed in a 500-part of a 5% solution of NaOH to form the sodium salt. The granules are then washed with distilled water to remove mechanically-held NaOH and kept in a moist condition.

Twenty-five (25) parts of the Na salt of the resin are added to 100 parts of solution containing 5 parts of $CuCl_2$ and allowed to stand for one hour. The resin becomes blue in color and the copper becomes substantially exhausted from the solution. Similar exhaustions are obtained when a 1% solution of $CuCl_2$ in a 3% NaCl solution, or a 0.1% solution of $CuCl_2$ in a 1% NaCl solution is used.

Recovery of copper is also obtained from solutions containing other alkali and alkali-earth salts such as the salts of potassium, lithium, magnesium, calcium, strontium, such as their chlorides, nitrates, sulfates, phosphates, and acetates. For example, all of the copper is recovered readily from a 15% calcium chloride solution having 25 p.p.m. of copper ion, as well as when the potassium, lithium, cesium, barium and calcium salts of the coordination resin is used. Using the procedure described by J. Bjerrum ("Metal Amine Formation in Aqueous Solution," publisher Haase and Son, Copenhagen, 1941) it is determined that the polymer forms both 1:1 and 1:2 chelates whose stability constants are approximately $K_1=5.75\times10^9$, and $K_2=1.52\times10^6$. The polymer also forms coordinate compounds with ferric chloride corresponding to a 1:1, 1:2 and 1:3 below pH values of about 8.5, and the stability constants of these compounds are approximately about $K_1=1.25\times10^{10}$, $K_2=4.55\times10^7$ and $K_3=8.1\times10^4$.

EXAMPLE XLV

The procedure of Example XLIV is repeated with cobaltic chloride solutions and the metal is recovered in a similar manner. During the process the coordination polymer becomes red as it reacts with the cobalt ions.

When solutions of silver, cadmium, molybdenum, aluminum, cesium, lanthanum, chromium, manganous, manganic, ferrous, ferric, nickel, zinc, lead, platinum, palladium, vanadium, tantalum, zirconium, titanium, and uranium ions are used instead of the cobalt ions, they are also recovered in a similar fashion.

EXAMPLE XLVI

Using the procedure of Example XLIV, coordination derivatives are formed with the individual resins of Examples XXVII to XLI inclusive, with copper and the metal ions of Example XLV.

The aldehyde-amidogen polymers represent only one type of condensation polymers that can be prepared from the new reactive triazine compounds of this invention through condensation polymerization reactions. By condensation polymerization is meant an intermolecular reaction involving at least one of the triazines of this invention with at least one related polyfunctional molecule, which as a result of inter-reaction liberates a by-product molecule. Condensation polymers, other than the aldehyde-amidogen polymers such as the polyester-, the polyamide-, the polyalkylene-, the polyarylene-, etc., types are also readily prepared from the reactive triazine compounds of this invention; and, all of these polymers have, as a repeating unit, the same fundamental moiety, namely, a 1,3,5-triazine

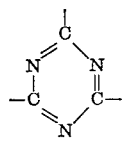

to which is attached at least one T group and these polymers have the property of coordinating with metal ions, which property is conferred to the polymer from the triazine compound from which they are prepared.

Another modification of condensation polymerization is the reaction of a preformed polymer containing active hydrogens with the triazine compounds of this invention, which contain functional or reactive groups. Illustrative of such polymers are cellulose and cellulose derivatives, polyvinyl alcohol and its copolymers, polyacrylic and polymethacrylic acid and its copolymers, polyacrylamide and its copolymers, phenol-formaldehyde resins, polyethylene imines, etc.

These same characteristics, namely, (1) the property of coordinating with metal ions and (2) the existence, in the repeating unit, of the triazinyl moiety to which is attached at least one T group, are also found in the addition polymers prepared from the reactive intermediates of this invention.

By an addition polymerization is meant an intermolecular reaction involving at least a triazine of this invention which occurs without the formation of by-product molecules. The preparation of addition polymers from the new triazine compounds of this invention is readily demonstrated by the polymerization of the new triazine derivatives which have at least one polymerization ethylenic group attached to the triazine ring, such as illustrated by $CH_2=CHC_6H_4NH(C_3N_3)T_2$, $(CH_2=CHC_6H_4NH)_2C_3N_3(T)$
$CH_2=CHCOOCH_2CH_2NH(C_3N_3)T_2$ $(CH_2=CHCOOCH_2CH_2NH)_2C_3N_3(T)$, etc. These compounds are vinyl type monomers from which polymers may be prepared by methods well known in the polymer art. They may be polymerized alone or with each other or with other monomers to produce fusible or crosslinked polymers and copolymers suitable for chelating resin use as well as for pigment production. When the triazine monomer possess only one $CH_2=CH-$ group such as in $CH_2=CHC_6H_4NH(C_3N_3)T_2$ and $CH_2=CHCOOCH_2CH_2NH(C_3N_3)T_2$ then thermoplastic polymers are obtained, whereas as when the triazine monomer contains at least two $CH_2=CH-$ groups then crosslinked polymers are obtained.

By copolymerizing a monovinyl triazine compound of this invention with a divinyl triazine compound, crosslinked copolymers are obtained. Such crosslinking can also be obtained by using a monovinyl triazine compound with another crosslinking agent which is not a triazine. Such crosslinking compounds can possess a multiplicity of vinyl vinylene or vinylidene group.

A few illustrative examples of crosslinking monomers, that is, monomers having a multiplicity of vinyl, vinylene or vinylidene groups are divinylbenzene, divinylnaphthalene, vinyl isopropenyl benzene, vinyl allyl benzene, diisopropenyl benzene, diallyl benzene; the polyunsaturated esters such as ethylene glycol diacrylate, ethylene glycol dimethacrylate, trimethylene glycol dimethacrylate, diallyl itaconate, glycol maleate, diallyl succinate, divinyl phthalate, diallyl maleate; the polyunsaturated ethers such as divinyl ether, trimethylene glycol divinyl ether, hydroquinone divinyl ether, catechol divinyl ether, resorcinol divinyl ether, hydroquinone diallyl ether, catechol diallyl ether, resorcinol diallyl ether; vinyl allylphenyl ether, vinyl vinylphenyl ether, allyl vinylphenyl ether, vinyloxyvinyl benzoate, vinyloxy-allyl benzoate, allyloxy allylbenzoate; the polyunsaturated amides such as ethylene diacrylamide, ethylene dimethacrylamide, N-vinylacrylamide, N,N'-divinylphthalic diamide, N,N'-diallylphthalamide, etc., and other polyunsaturated modifiers such as vinyl phenylacrylate, 2-isopropenyl-5-acryloxynaphthalene, vinyl-3,5-diallyloxypalmitate, etc. The crosslinking monomers may be used alone or in conjunction with each other or with other monomers having one vinyl, vinylene or vinylidene group such as vinyl chloride, vinyl acetate, vinylpropionate, vinylbutyrate, vinylstearate, acrylonitrile, methacrylonitrile, vinylidene chloride, vinylene cyanide, alpha-chloroacrylonitrile, acrylic acid, the acrylic esters such as the methyl, ethyl, propyl, butyl, etc. acrylates; methacrylic acid and its esters such as the methyl, ethyl, propyl, butyl, hexyl, phenyl, etc. methacrylates; itaconic anhydride, itaconic acid and their mono- and di-esters, such as the methyl, ethyl, propyl, etc. esters; the acrylic, methacrylic, chloroacrylic and the cyanoacrylic amides, N-alkyl amides, N,N-dialkyl amides; the alkenylaryl compounds such as styrene, the monomethyl styrenes, the dimethyl styrenes, alpha-methyl styrenes, the mono- di- and trichlorostyrenes, the o-, m- and p-acetamido styrenes; vinyl naphthalene, vinyl carbazole, etc.; the alkenylaryl heterocyclic compounds such as vinyl pyridine, vinyl methyl pyridine, vinyl quinoline; the diene-1,3 compounds such as butadiene-1,3, isoprene 2,3-dimethyl butadiene-1,3, chloroprene, 2-phenylbutadiene-1,3, methly vinyl ketone, ethyl vinyl ketone, methyl isopropenyl ketone, N-vinyl imidazole, the vinyl azlactones, the N-vinyl-2-oxazolidinones, maleic anhydride, dimethyl maleate, etc.

These polymers and copolymers may be prepared in mass, in solution, in suspension and emulsion systems, using the accepted initiating systems, such as the per compounds which generate radicals, or thermally, or with ultraviolet light or with ionizing radiation and in some cases with ionic catalysts, both anionic and cationic, e.g., $BF_3$, $NaNH$, $BuLi$, $HF$, etc.

The formation of other types of addition polymers from the triazines of this invention is illustrated further by the reaction through ring opening of triazine compounds containing at least one T group and an other group containing the structure

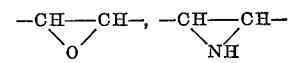

etc., or by the addition reaction of a triazine containing at least one T group and two —NCO groups with another compound, including triazines which contain at least two active hydrogens such as diols, diamines, amino alcohols, etc., or by the reaction of a triazine having at least one T group and two other groups containing active hydrogens with a diisocyanate, etc.

Typical examples of other condensation polymerizations and a number of addition polymerizations within the scope of this invention are illustrated in the following examples.

EXAMPLE XLVII

Example XVII is repeated to obtain the compound $Cl(C_3N_3)[NHN(CH_2COONa)_2]_2$, then there is added 440 g. of polyvinyl alcohol (mol. wt. of about 4000) in 8000 parts of water and 40 g. of NaOH and the mixture heated to 80–100° C. with stirring for about three hours.

There is obtained a viscous aqueous dispersion of a polymer having one in ten hydroxyls converted to a cyanurate of the triazine compound of the general formula $$\left(\begin{array}{c}CH_2CH\\|\\OH\end{array}\right)_9 \begin{array}{c}-CH_2CH-\\|\\O(C_3N_3)[NHN(CH_2COONa)_2]_2\end{array}$$

which forms coordination compounds with copper ions and with the metal ions of Example XLV.

EXAMPLE XLVIII

Example XVII is repeated to prepare the compound $$Cl(C_3N_3)NHN(CH_2COONa)_2 \ _2$$

825 parts of soda-cellulose (i.e. one mole of NaOH for each anhydroglucoside unit) in 8000 parts of water and the mixture heated at 75–85° C. for four hours, following which it is acidified with dilute hydrochloric acid and there is obtained the triazinyl cellulose derivative having about 1 to 5 glucoside units as a cyanurate of the general formula $$\begin{array}{c}\phantom{xx}CHOH-CHOH\\-CH\phantom{xxxxxx}CHO-\\\phantom{xx}CH\phantom{xxxxx}O\\|\\CH_2O(C_3N_3)[NHN(CH_2COOH)_2]_2\end{array}$$

which forms coordination compounds similar to the polymer derivative of Example XLVII.

EXAMPLE XLIX

To 39.7 parts of $$(HOCH_2CH_2NH)_2C_3N_3NHN(CH_2COONa)_2$$

in 400 parts of water in a reaction vessel equipped with a stirrer and heating means, is added slowly with stirring at 45–50° C. a solution of 20.1 parts adipoyl chloride, $ClOC(CH_2)_6COCl$ in 100 parts of carbon tetrachloride and there is obtained the polymer, after removal of water and $CCl_4$, corresponding to the structure $$-\left[OCH_2CH_2HN-C\begin{array}{c}N\\\diagup\phantom{xx}\diagdown\\\phantom{xx}\phantom{xx}\\N\phantom{xx}N\\\diagdown\phantom{xx}\diagup\\C\\|\\NHNCH_2COOH_2\end{array}C-NHCH_2CH_2OC(CH_2)_6CO\right]_n-$$

which exhibits coordination properties.

EXAMPLE L

The procedure of Example XLIX is repeated using 33.1 parts of $(NH_2NH)_2C_3N_3NHN(CH_2COONa)$ with 20.1 parts of adipoyl chloride and there is obtained the polymer with the repeating structure, $$-\left[HNHN-C\begin{array}{c}N\\\diagup\phantom{xx}\diagdown\\\phantom{xx}\phantom{xx}\\N\phantom{xx}N\\\diagdown\phantom{xx}\diagup\\C\\|\\NHN(CH_2COOH)_2\end{array}C-NHNHOC(CH_2)_6CO\right]_n-$$

which exhibits coordination properties.

EXAMPLE LI

Forty-five and five tenths parts (45.5) of $$(C_6H_5O)_3C_3N_3NHN(CH_2COONa)_2$$

and 6.0 parts of $H_2NCH_2CH_2NH_2$ are refluxed in 200 parts of dioxane for eight hours, and then 20 parts of 36% aqueous HCl added and the water and dioxane removed at 1.5 mm. pressure and the product washed with water to remove sodium chloride and there is obtained a polymer having the structure $$-\left[C\begin{array}{c}N\\\diagup\phantom{xx}\diagdown\\\phantom{xx}\phantom{xx}\\N\phantom{xx}N\\\diagdown\phantom{xx}\diagup\\C\\|\\NHN(CH_2COOH)_2\end{array}C-NHCH_2CH_2NH\right]_n-$$

EXAMPLE LII

The procedure of Example LI is repeated using 10.8 parts of p-phenylene diamine instead of ethylene diamine and there is obtained a polymer having the structure $$-\left[C\begin{array}{c}N\\\diagup\phantom{xx}\diagdown\\\phantom{xx}\phantom{xx}\\N\phantom{xx}N\\\diagdown\phantom{xx}\diagup\\C\\|\\NHN(CH_2COOH)_2\end{array}C-NH-\phantom{x}\bigcirc\phantom{x}-NH\right]_n-$$

EXAMPLE LIII

To 34.1 parts of $$[(CH_2-CHCH_2NH)C_3N_3N(C_2H_5)_2]\ [NHN(CH_2COONa)_2]$$
$$\diagdown O \diagup$$

in 500 parts of tetrahydrofuran is added one part of tributyl amine and the mixture refluxed for one hour and then the furane removed at reduced pressure, leaving a polymer having the repeating unit, $$-\left[OCH_2CH\atop\phantom{xx}|\phantom{xx}\right]_n-$$
$$\phantom{xxxxx}CH_2$$
$$\phantom{xxxxx}|$$
$$\phantom{xxxxx}NH$$
$$\phantom{xxxxx}|$$
$$\phantom{xxxxx}C$$
$$\phantom{xxx}\diagup\phantom{xx}\diagdown$$
$$\phantom{xxx}N\phantom{xxxx}N$$
$$(C_2H_5)_2N-C\phantom{xxx}C-NHN(CH_2COONa)_2$$
$$\phantom{xxxxx}\diagdown N\diagup$$

EXAMPLE LIV

Fifty parts of distilled water, 0.5 parts of hydroxy apatite (0.005 to 0.2 micron size) 0.1 part of sodium dodecylbenzenesulfonate, 0.1 part of benzoyl peroxide and 30 parts of $$CH_2=CHC_6H_4NH(C_3N_3)[NHN(CH_2COOC_2H_5)_2]_2$$

are mixed in a suitable reaction vessel under deoxygenated nitrogen and stirred for twenty-eight hours at 90–95° C., and the polymer is isolated by filtration, washed with alcohol and refluxed for twelve hours, with 500 parts of 10% alcoholic KOH, then neutralized with aqueous HCl to produce the polymer having the structure $$-\left[CH_2-CH\right]_n-$$
$$\phantom{xxxx}|$$
$$\phantom{xxxx}C_6H_4NH$$
$$\phantom{xxxxx}|$$
$$\phantom{xxxxx}C$$
$$\phantom{xxx}\diagup\phantom{xx}\diagdown$$
$$\phantom{xxx}N\phantom{xxxx}N$$
$$HOOCCH_2)_2NHN-C\phantom{xxx}C-NHN(CH_2COOH)_2$$
$$\phantom{xxxxx}\diagdown N\diagup$$

EXAMPLE LV

The procedure of Example LIV is repeated using 30 parts of $$(CH_2=CHCOOCH_2CH_2NH)_2C_3N_3$$
$$\phantom{xxxxxxxxxx}NHCH_2CH_2N(CH_2COOH)_2$$

and there is obtained the cross-linked polymer having the repeating unit

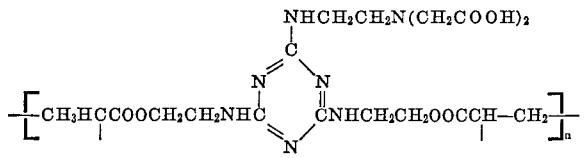

EXAMPLE LVI

Forty-nine parts of $HOCH_2CH_2N(CH_3N_3)NHCH_2CH_2N(CH_2COOH)_{22}$ are heated in a reaction flask in nitrogen at 160° C. for four hours or until about two (2) parts of water are eliminated. The reaction is then cooled and a crosslinked polyester resin having coordination properties obtained having the repeating structure

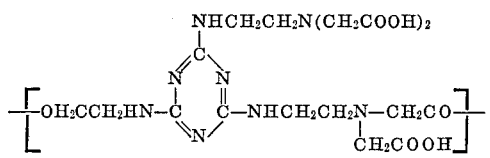

which exhibits coordination properties.

EXAMPLE LVII

To a mixture of three parts of water, 2 parts of triethyl amine, one part of glycerine and thirty parts of $(HOCH_2CH_2NH)_2C_3N_3NHN(CH_2COONa)_2$ is added rapidly with vigorous stirring eighteen parts of toluene diisocyanate and in a short time, foaming occurs and a crosslinked polyurethane having metal coordination properties is obtained.

While the invention has been described in relation to various specific embodiments thereof, it is understood that many substitutions and other modifications thereof can be made within the scope and spirit of the invention.

I claim:

1. A composition of matter comprising the reaction product of a mixture comprising an aldehyde and a triazine of the formula

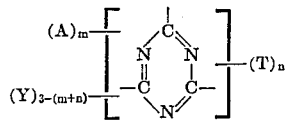

wherein $n$ and $m$ are integers of at least one and no more than 2 and the sum of $m$ and $n$ does not exceed three; A is an aldehyde-reactable group; Y is any monovalent radical and T is selected from the class of

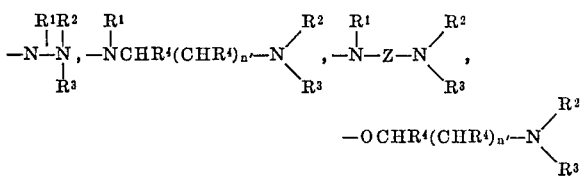

and

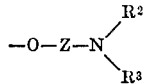

wherein each of the symbols $R^1$, $R^2$ and $R^3$ individually represents a radical selected from the class of —H, —CHR$^4$COOM and a hydrocarbon radical wherein at least one of the radicals represented by $R^1$, $R^2$ and $R^3$ contain a carboxyl group; M is a member consisting of hydrogen, ammonium bases and metals and $R^4$ represents a radical selected from the class consisting of hydrogen and a hydrocarbon radical containing 1 to 6 carbon atoms; $n'$ represents an integer of 1 to 6; and —Z— is a divalent aromatic hydrocarbon radical containing six to twelve carbon atoms.

2. The composition of claim 1 wherein the triazine contains one T group and two other groups possessing aldehyde-reactable amino groups.

3. The composition of claim 1 wherein the triazine contains two T groups and one other group possessing an aldehyde-reactable amino group.

4. The composition of claim 2 wherein the triazine is $(NH_2)_2C_3N_3T$.

5. The composition of claim 3 in which the triazine is $NH_2(C_3N_3)T_2$.

6. The composition of claim 2 in which the aldehyde is formaldehyde.

7. The composition of claim 6 in which the T group is —NHN(CH$_2$COOM)$_2$.

8. The composition of claim 6 in which the T group is —NHCH$_2$CH$_2$N(CH$_2$COOM)$_2$.

9. The composition of claim 6 in which the T group is —OC$_6$H$_4$N(CH$_2$COOM)$_2$.

10. The composition of claim 6 in which the T group is —OCH$_2$CH$_2$N(CH$_2$COOM)$_2$.

11. The composition of claim 1 in which the reaction is performed in the presence of urea.

12. The composition of claim 1 in which the reaction is performed in the presence of melamine.

13. The composition of claim 1 in which the reaction is performed in the presence of a methylol melamine.

14. The composition of claim 1 in which the condensation is performed in the presence of dimethylol urea.

15. The composition of claim 1 in which the reaction mixture comprises formaldehyde and $(NH_2)_2C_3N_3NHN(CH_2COONa)_2$ 16. The composition of claim 1 in which the reaction mixture comprises formaldehyde and $(NH_2)_2C_3N_3NHCH_2CH_2N(CH_2COONa)_2$ 17. The composition of claim 1 in which the reaction mixture comprises formaldehyde and $(NH_2)_2C_3N_3OCH_2CH_2N(CH_2COONa)_2$ 18. The composition of claim 15 in which a melamine is present during the reaction.

19. The composition of claim 17 in which a melamine is present during the reaction.

20. A coordination polymer comprising the insoluble, infusible condensation product of claim 1.

References Cited

UNITED STATES PATENTS 3,278,253   10/1966   Weckler et al. _____ 260—249.8

WILLIAM H. SHORT, Primary Examiner

T. PERTILLA, Assistant Examiner

U.S. Cl. X.R.

8—94.24; 117—123, 128.4, 138.5, 142, 144, 145, 161; 161—257, 259, 263; 260—2.1, 37